(12) United States Patent
Mizuguchi et al.

(10) Patent No.: US 11,116,255 B2
(45) Date of Patent: *Sep. 14, 2021

(54) POWER SUPPLY UNIT OF AEROSOL GENERATION APPARATUS

(71) Applicant: JAPAN TOBACCO INC., Tokyo (JP)

(72) Inventors: Kazuma Mizuguchi, Tokyo (JP); Manabu Yamada, Tokyo (JP)

(73) Assignee: JAPAN TABACCO INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,475

(22) Filed: Jul. 17, 2020

(65) Prior Publication Data
US 2021/0015164 A1 Jan. 21, 2021

(30) Foreign Application Priority Data
Jul. 17, 2019 (JP) .............................. JP2019-131691

(51) Int. Cl.
| | | |
|---|---|---|
| *A24F 40/53* | (2020.01) | |
| *A24F 40/51* | (2020.01) | |
| *G01M 3/18* | (2006.01) | |
| *G06F 1/3296* | (2019.01) | |
| *H01M 10/48* | (2006.01) | |
| *H02J 7/00* | (2006.01) | |
| *H02J 7/34* | (2006.01) | |

(Continued)

(52) U.S. Cl.
CPC .............. *A24F 40/53* (2020.01); *A24F 40/51* (2020.01); *G01M 3/184* (2013.01); *G06F 1/3296* (2013.01); *H01M 10/48* (2013.01); *H02J 7/0068* (2013.01); *H02J 7/345* (2013.01); *H02J 9/061* (2013.01); *A24F 40/10* (2020.01)

(58) Field of Classification Search
CPC .......... A24F 40/53; A24F 40/51; H02J 7/345; H01M 10/48; G01M 3/184; G06F 1/3296
See application file for complete search history.

(56) References Cited

U.S. PATENT DOCUMENTS

| | | | |
|---|---|---|---|
| 2007/0229294 A1 | 10/2007 | Vossmeyer et al. | |
| 2007/0275296 A1* | 11/2007 | Ueda ..................... | G01M 3/186 429/61 |
| 2010/0102975 A1 | 4/2010 | Vossmeyer et al. | |

(Continued)

FOREIGN PATENT DOCUMENTS

| | | |
|---|---|---|
| CA | 3079160 A1 | 4/2019 |
| CN | 103099319 B | 7/2015 |

(Continued)

OTHER PUBLICATIONS

Office Action dated Oct. 8, 2020 in Korean Patent Application No. 10-2020-0087269, 27 pages.

(Continued)

*Primary Examiner* — David Z Huang
(74) *Attorney, Agent, or Firm* — Xsensus LLP

(57) ABSTRACT

A power supply unit of an aerosol generation apparatus includes: a power supply capable of discharging to a load for generating an aerosol from an aerosol source; a controller configured to control the power supply; and a housing configured to house the power supply and the controller. The controller is configured to detect at least one of leakage of a liquid inside the housing and entering of a liquid into the housing.

20 Claims, 14 Drawing Sheets

(51) Int. Cl.
*H02J 9/06* (2006.01)
*A24F 40/10* (2020.01)

(56) References Cited

U.S. PATENT DOCUMENTS

| | | | |
|---|---|---|---|
| 2014/0334804 A1* | 11/2014 | Choi | A61M 11/042 |
| | | | 392/404 |
| 2016/0321879 A1 | 11/2016 | Oh et al. | |
| 2017/0245547 A1 | 8/2017 | Lipowicz | |
| 2018/0020727 A1 | 1/2018 | Hoffman et al. | |
| 2018/0294118 A1 | 10/2018 | Furuuchi et al. | |
| 2018/0375074 A1* | 12/2018 | Sugiyama | H01M 10/425 |
| 2019/0131668 A1 | 5/2019 | Bitauld et al. | |
| 2019/0337475 A1 | 11/2019 | Kawamura | |
| 2021/0015163 A1* | 1/2021 | Mizuguchi | A24F 40/53 |

FOREIGN PATENT DOCUMENTS

| | | |
|---|---|---|
| CN | 107432498 A | 12/2017 |
| CN | 109725030 A | 5/2019 |
| EP | 3 072 406 A1 | 9/2016 |
| EP | 3 476 645 A1 | 5/2019 |
| JP | 10-012284 A | 1/1998 |
| JP | 2016-536023 A | 11/2016 |
| JP | 2019-022494 A | 2/2019 |
| KR | 10-2007-0098691 A | 10/2007 |
| KR | 10-2017-0067171 A | 6/2017 |
| KR | 10-2018-0038549 A | 4/2018 |
| KR | 10-2018-0116249 A | 10/2018 |
| WO | 2015/035510 A1 | 3/2015 |
| WO | 2018/142734 A1 | 8/2018 |
| WO | 2019/064364 A1 | 4/2019 |
| WO | 2019/077712 A1 | 4/2019 |

OTHER PUBLICATIONS

European Search Report dated Nov. 11, 2020 in European Application No. 20186212.5.
Notification of Reasons for Refusal received for Japanese Patent Application No. 2019-131691, dated Oct. 15, 2019, 7 pages including English Translation.
Decision to Grant a Patent received for Japanese Patent Application No. 2019-131691, dated Mar. 3, 2020, 5 pages including English Translation.
Chinese Office Action dated Jun. 30, 2021, in corresponding Chinese Patent Application No. 202010690466.4.

* cited by examiner

POWER SUPPLY UNIT OF AEROSOL GENERATION APPARATUS

CROSS-REFERENCE TO RELATED APPLICATIONS

This application is based on and claims priority under 35 USC 119 from Japanese Patent Application No. 2019-131691 filed on Jul. 17, 2019, the contents of which are incorporated herein by reference.

TECHNICAL FIELD

The present disclosure relates to a power supply unit of an aerosol generation apparatus, a control method of the power supply unit of the aerosol generation apparatus, and a control program of the power supply unit of the aerosol generation apparatus.

BACKGROUND ART

Japanese Translation of PCT International Application Publication No. JP-T-2016-536023 (hereinafter, referred to as Patent Literature 1) discloses a personal electronic inhaler including a power supply such as a battery, an atomizer that may include one or a plurality of heating element(s), and a bulkhead for separating a battery from an atomizer region. According to such a personal electronic inhaler, when an electrolytic solution leaks from the battery, the bulkhead can prevent the electrolytic solution from flowing out to an atomizer side.

Description of Chinese Patent Publication No. 103099319 (hereinafter, referred to as Patent Literature 2) discloses a sealing layer that prevents outflow of an electrolytic solution and an adsorption layer that adsorbs the electrolytic solution when the outflow of the electrolytic solution cannot be stopped by the sealing layer.

Description of Chinese Patent Publication No. 107432498 (hereinafter, referred to as Patent Literature 3) discloses an electronic cigarette in which a housing made of aluminum and a plastic film is provided in a housing made of steel in order to prevent an electrolytic solution from flowing out to outside.

However, in Patent Literatures 1 to 3, although a method is disclosed which prevents other components and the like from being influenced when the electrolytic solution leaks from the battery, the leakage of the electrolytic solution from the battery cannot be recognized. In other words, even after the electrolytic solution leaks, an operation of the personal electronic inhaler or the like is continued.

In Patent Literatures 1 to 3, when a liquid enters into the housing due to submersion or the like, the entering of the liquid cannot be recognized. In a power supply unit of an aerosol generation apparatus, it is important to avoid an influence of leakage of a liquid and/or entering of a liquid on an operation of the aerosol generation apparatus.

An object of the present disclosure is to provide a power supply unit of an aerosol generation apparatus that can avoid an influence of at least one of leakage of a liquid and entering of a liquid on an operation of the aerosol generation apparatus, a control method of the power supply unit of the aerosol generation apparatus, and a control program of the power supply unit of the aerosol generation apparatus.

SUMMARY

A power supply unit of an aerosol generation apparatus of the present disclosure includes: a power supply capable of discharging to a load for generating an aerosol from an aerosol source; a controller configured to control the power supply; and a housing configured to house the power supply and the controller. The controller is configured to detect at least one of leakage of a liquid inside the housing and entering of a liquid into the housing.

A power supply unit of an aerosol generation apparatus of the present disclosure includes: a power supply configured to discharge to a load that generates an aerosol from an aerosol source; a controller configured to control the power supply; a housing configured to house the power supply and the controller; a suction sensor configured to detect a user's suction; and an electrostatic capacitance sensor that is separate from the suction sensor and housed in the housing. The controller is electrically connected to the power supply, the suction sensor, and the electrostatic capacitance sensor.

A control method of a power supply unit of an aerosol generation apparatus of the present disclosure, in which a power supply is housed in a housing, the power supply being capable of discharging to a load for generating an aerosol from an aerosol source, the control method including: detecting at least one of leakage of a liquid inside the housing and entering of a liquid into the housing.

A control program of a power supply unit of an aerosol generation apparatus in which a power supply is housed in a housing, the power supply being capable of discharging to a load for generating an aerosol from an aerosol source, the control program causing a computer to perform a step of: detecting at least one of leakage of a liquid inside the housing and entering of a liquid into the housing.

According to the present disclosure, the influence of at least one of the leakage of the liquid and the entering of the liquid can be avoided.

DESCRIPTION OF EMBODIMENTS

Hereinafter, a power supply unit of an aerosol generation apparatus according to an embodiment of the present disclosure will be described. First, an aerosol suction device on which the power supply unit is mounted will be described with reference to FIGS. 1 to 6.

(Aerosol Suction Device)

Figure 1:
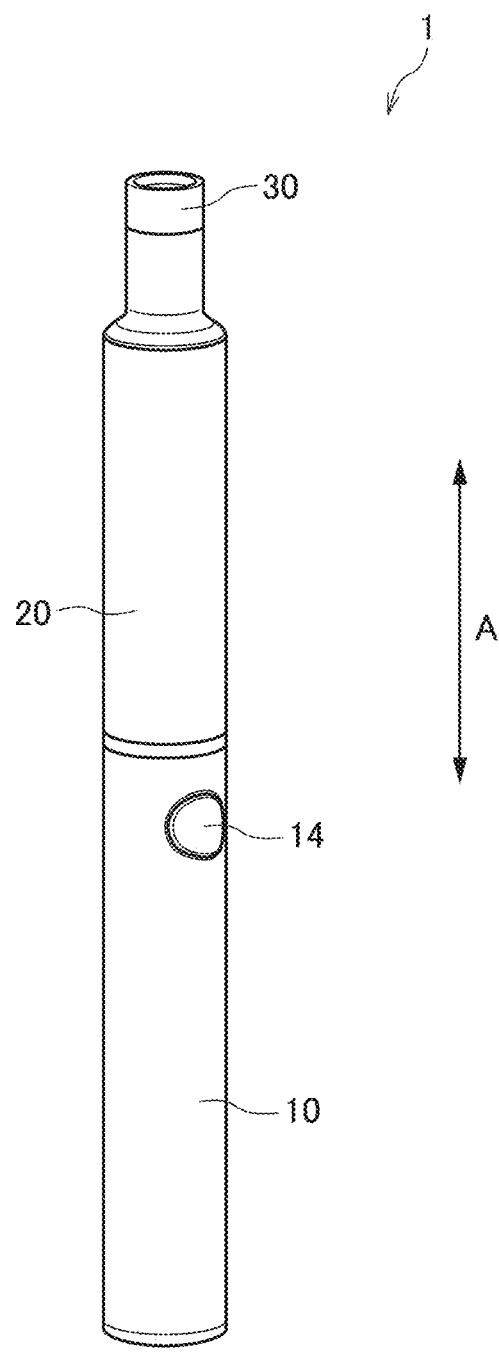
FIG. 1 is a perspective view of an aerosol suction device on which a power supply unit according to an embodiment of the present disclosure is mounted.
Figure 2:
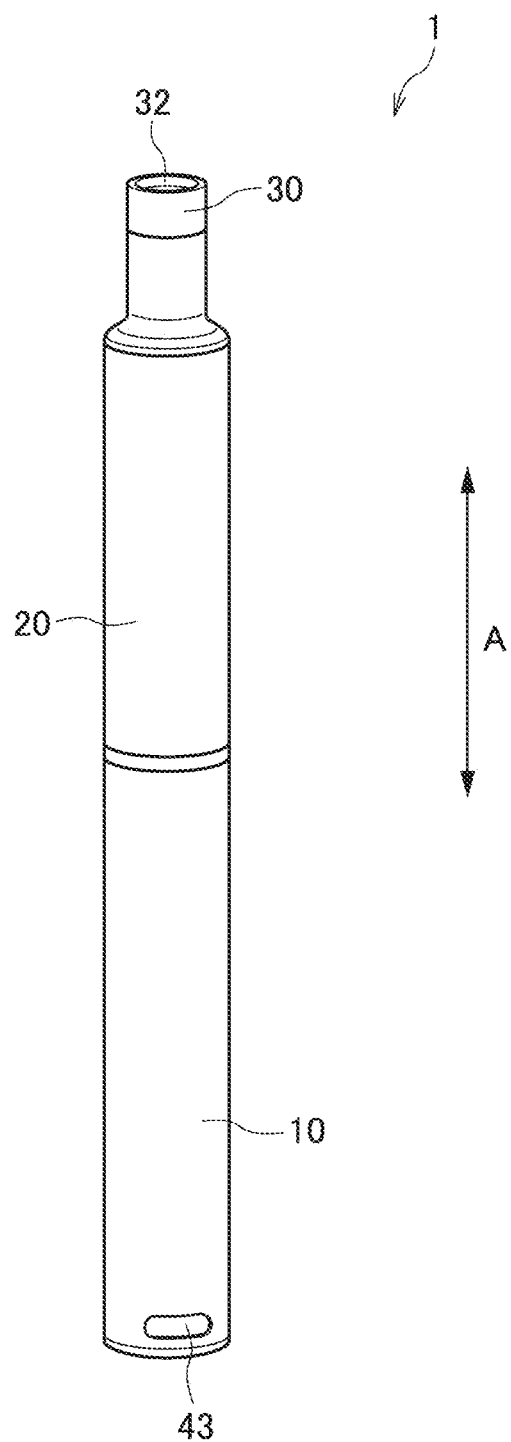
FIG. 2 is another perspective view of the aerosol suction device of FIG. 1.

An aerosol suction device 1 is a device for suctioning a flavor without combustion and has a rod shape that extends along a predetermined direction (hereinafter, referred to as a longitudinal direction A). As shown in FIGS. 1 and 2, the aerosol suction device 1 is provided with a power supply unit 10, a first cartridge 20, and a second cartridge 30 in this order along the longitudinal direction A. The first cartridge 20 is attachable to and detachable from the power supply unit 10, and the second cartridge 30 is attachable to and detachable from the first cartridge 20. In other words, the first cartridge 20 and the second cartridge 30 can be replaced with each other.

(Power Supply Unit) As shown in FIGS. 3 to 6, the power supply unit 10 of the present embodiment houses a power supply 12, a charger 13, a controller 50, various sensors, and the like inside a cylindrical power supply unit case 11.

The power supply 12 is a rechargeable secondary battery, and preferably a lithium-ion secondary battery. The power supply 12 of the present embodiment includes a cylindrical case 12a that houses various components such as an electrode and an electrolytic solution (not shown). A pair of tabs 12b (see FIG. 8) serving as positive and negative electrodes are provided at one end portion or both end portions of the power supply 12 in a length direction (longitudinal direction A). In other words, the positive electrode tab 12b may be provided on one end of both ends of the power supply 12 in the length direction, and the positive electrode tab 12b may be provided on the other end of both ends of the power supply 12 in the length direction. Alternatively, both the positive electrode tab 12b and the negative electrode tab 12b may be provided on one end of the power supply 12 in the length direction. Further, the power supply 12 includes a safety valve (not shown) that opens when an internal pressure of the power supply 12 is larger than a predetermined pressure, on one end portion or both end portions in the length direction.

A discharge terminal 41 is provided on a top portion 11a positioned on one end side (first cartridge 20 side) of the power supply unit case 11 in the longitudinal direction A. The discharge terminal 41 protrudes from an upper surface of the top portion 11a toward the first cartridge 20 and can be electrically connected to a load 21 of the first cartridge 20.

An air supply portion 42 that supplies air to the load 21 of the first cartridge 20 is provided in the vicinity of the discharge terminal 41 on the upper surface of the top portion 11a.

A charging terminal 43 that can be electrically connected to an external power supply 60 (see FIG. 5) that can charge the power supply 12 is provided inside a bottom portion 11b positioned on the other end side (side opposite to the first cartridge 20) of the power supply unit case 11 in the longitudinal direction A. The charging terminal 43 is provided inside a side surface of the bottom portion 11b, and at least one of a USB terminal, a microUSB terminal, and a Lightning (registered trademark) terminal can be connected to the charging terminal 43.

The charging terminal 43 may be a power receiving unit that can receive, in a wireless manner, power supplied from the external power supply 60. In such a case, the charging terminal 43 (power receiving unit) may be configured with a power receiving coil. A method for the wireless power transfer may be electromagnetic induction or magnetic resonance. Further, the charging terminal 43 may be a power receiving unit that can receive, without contact, the power supplied from the external power supply 60. As another example, at least one of the USB terminal, the microUSB terminal, and the Lightning (registered trademark) terminal can be connected to the charging terminal 43, and the charging terminal 43 may include the above-described power receiving unit.

That is, in the power supply unit 10, the discharge terminal 41 and the charging terminal 43 are separately configured and arranged apart from each other in the longitudinal direction A. Therefore, the power supply unit 10 is configured such that the external power supply 60 can be electrically connected to the charging terminal 43 in a state where the power supply 12 can be discharged via the discharge terminal 41. Further, in the power supply unit 10, when an aerosol generation request is detected while the charging terminal 43 and the external power supply 60 are electrically connected, simultaneous charging and discharging of the power supply 12 is prohibited.

The power supply unit case 11 is provided with an operation unit 14 that can be operated by a user, on a side surface of the top portion 11a, so as to face a side opposite to the charging terminal 43. More specifically, the operation unit 14 and the charging terminal 43 are in a point-symmetrical relationship with an intersection of a straight line that connects the operation unit 14 to the charging terminal 43 and a center line L of the power supply unit 10 in the longitudinal direction A. The operation unit 14 is configured with a button type switch, a touch panel, and the like and is used when a use intention of the user is reflected so as to activate/interrupt the controller 50 and various sensors. The controller 50 and an intake sensor 15 that detects a puff operation are provided in the vicinity of the operation unit 14.

The charger 13 controls charging power input from the charging terminal 43 to the power supply 12. The charger 13 is configured by using a charging IC that is mounted on a charging cable connected to the charging terminal 43 and that includes a converter that converts a direct current from an inverter 61 or the like into a direct current having different magnitude, a voltmeter, an ammeter, a processor, and the like. The inverter 61 or the like converts an alternating current into a direct current.

Figure 6:
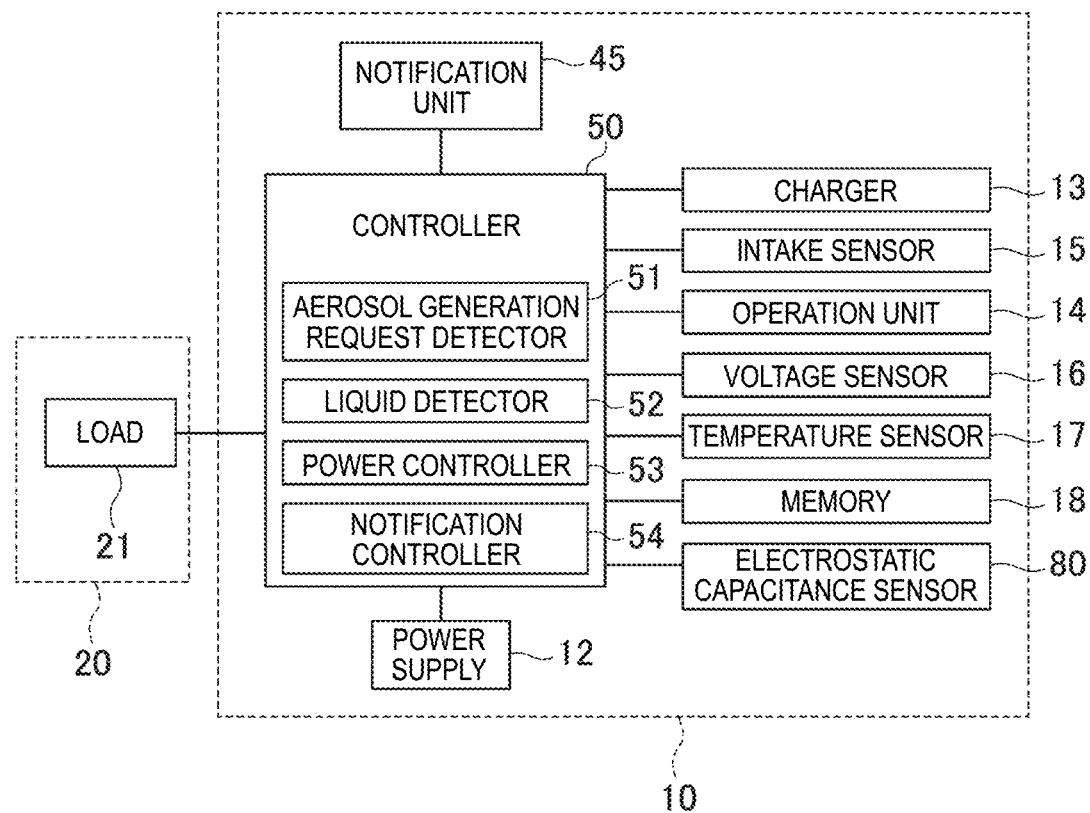
FIG. 6 is a block diagram showing a configuration of main parts of the power supply unit in the aerosol suction device of FIG. 1.

As shown in FIG. 6, the controller 50 is connected to the charger 13, the operation unit 14, various sensor devices such as the intake sensor 15 that detects the puff (intake)

operation, a voltage sensor 16 that measures a voltage of the power supply 12, a temperature sensor 17 that detects a temperature, an electrostatic capacitance sensor 80 that is separate from the intake sensor 15 and detects electrostatic capacitance inside the power supply unit case 11, and a memory 18 that stores the number of puff operations, time for energizing the load 21, or the like, and performs various controls of the aerosol suction device 1. The intake sensor 15 may be configured with a condenser microphone, a pressure sensor, or the like. Specifically, the controller 50 is a processor (MCU: Micro Controller Unit). More specifically, the structure of the processor is an electric circuit in which circuit elements such as semiconductor elements are combined. Details of the controller 50 will be described later.

The power supply unit case 11 is provided with an air intake port 11*c* that takes outside air into inside thereof. The air intake port 11*c* may be provided around the operation unit 14 or may be provided around the charging terminal 43.

(First Cartridge)

Figure 3:
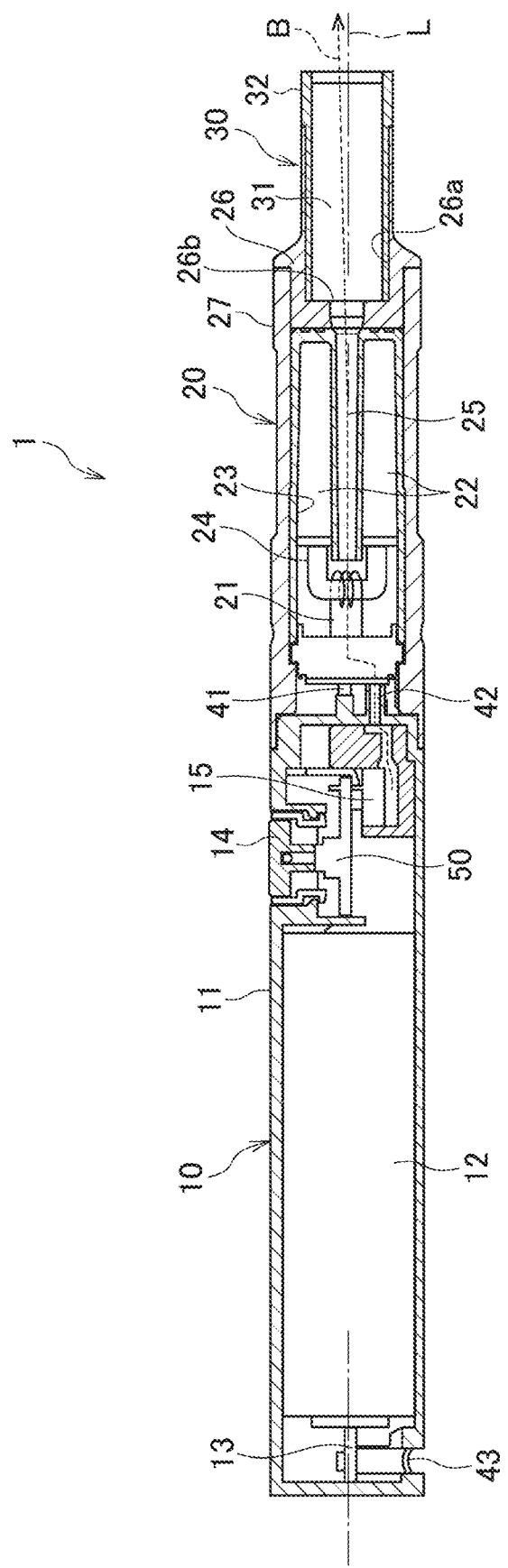
FIG. 3 is a cross-sectional view of the aerosol suction device of FIG. 1.

As shown in FIG. 3, the first cartridge 20 includes, inside a cylindrical cartridge case 27, a reservoir 23 that stores an aerosol source 22, the electrical load 21 that atomizes the aerosol source 22, a wick 24 that draws the aerosol source from the reservoir 23 into the load 21, an aerosol flow path 25 that causes an aerosol generated by the atomization of the aerosol source 22 to flow toward the second cartridge 30, and an end cap 26 that houses a part of the second cartridge 30.

The reservoir 23 is partitioned and formed so as to surround a periphery of the aerosol flow path 25 and stores the aerosol source 22. A porous body such as a resin web or cotton may be housed in the reservoir 23, and the aerosol source 22 may be impregnated in the porous body. In the reservoir 23, the porous body on the resin web or the cotton may not be housed and only the aerosol source 22 may be stored. The aerosol source 22 contains liquids such as glycerin, propylene glycol, and water.

The wick 24 is a liquid holding member that draws the aerosol source 22 from the reservoir 23 into the load 21 by using a capillary phenomenon, and is configured with, for example, glass fiber or porous ceramic.

The load 21 atomizes the aerosol source 22 without combustion by power supplied from the power supply 12 via the discharge terminal 41. The load 21 is configured with an electric heating wire (coil) wound at a predetermined pitch. The load 21 may be an element that can atomize the aerosol source 22 so as to generate an aerosol, and is, for example, a heating element or an ultrasonic generator. Examples of the heating element include a heating resistor, a ceramic heater, and an induction heating heater.

The aerosol flow path 25 is downstream of the load 21 and provided on the center line L of the power supply unit 10.

The end cap 26 includes a cartridge housing portion 26*a* that houses a part of the second cartridge 30, and a communication path 26*b* that communicates the aerosol flow path 25 with the cartridge housing portion 26*a*.

(Second Cartridge)

The second cartridge 30 stores a flavor source 31. The second cartridge 30 is detachably housed in the cartridge housing portion 26*a* provided in the end cap 26 of the first cartridge 20. An end portion of the second cartridge 30 on a side opposite to a first cartridge 20 side is a suction port 32 of the user. The suction port 32 is not limited to the case of being integrally formed with the second cartridge 30 and may be configured to be attachable to and detachable from the second cartridge 30. Accordingly, the suction port 32 is separate from the power supply unit 10 and the first cartridge 20, so that the suction port 32 can be kept hygienic.

The second cartridge 30 causes an aerosol generated by atomizing the aerosol source 22 by the load 21 to pass through the flavor source 31, so that a flavor is given to the aerosol. As a raw material piece that constitutes the flavor source 31, a molded body obtained by molding shredded tobacco or a tobacco raw material into a granular shape can be used. The flavor source 31 may be configured with a plant other than tobacco (for example, mint, Chinese herbs, herbs, or the like). A flavor material such as menthol may be given to the flavor source 31.

In the aerosol suction device 1 of the present embodiment, the aerosol source 22, the flavor source 31, and the load 21 can generate an aerosol to which a flavor is added. That is, the aerosol source 22 and the flavor source 31 can be referred to as an aerosol generation source that generates an aerosol.

In addition to the configuration in which the aerosol source 22 and the flavor source 31 are separated from each other, the configuration of the aerosol generation source used in the aerosol suction device 1 may be a configuration in which the aerosol source 22 and the flavor source 31 are integrally formed, a configuration in which the flavor source 31 is omitted and a substance that may be contained in the flavor source 31 is added to the aerosol source 22, a configuration in which a medication or the like is added to the aerosol source 22 instead of the flavor source 31, or the like.

In the aerosol suction device 1 configured as described above, as indicated by an arrow B in FIG. 3, air that flows in from the air intake port 11*c* provided in the power supply unit case 11 passes near the load 21 of the first cartridge 20 from the air supply portion 42. The load 21 atomizes the aerosol source 22 drawn or moved from the reservoir 23 by the wick 24. An aerosol generated by the atomization flows through the aerosol flow path 25 together with air that flows in from the air intake port 11*c*, and is supplied to the second cartridge 30 via the communication path 26*b*. The aerosol supplied to the second cartridge 30 is given a flavor by passing through the flavor source 31 and is supplied to the suction port 32.

The aerosol suction device 1 is provided with a notification unit 45 that notifies various pieces of information. The notification unit 45 may be configured with a light-emitting element, may be configured with a vibration element, or may be configured with a sound output element. Further, the notification unit 45 may be a combination of two or more elements among the light-emitting element, the vibration element, and the sound output element. The notification unit 45 may be provided in any of the power supply unit 10, the first cartridge 20, and the second cartridge 30, and is preferably provided in the power supply unit 10 in order to shorten a conductive wire from the power supply 12. For example, a periphery of the operation unit 14 is translucent. The notification unit 45 emits light by a light-emitting element such as an LED.

(Electric Circuit)

Figure 5:
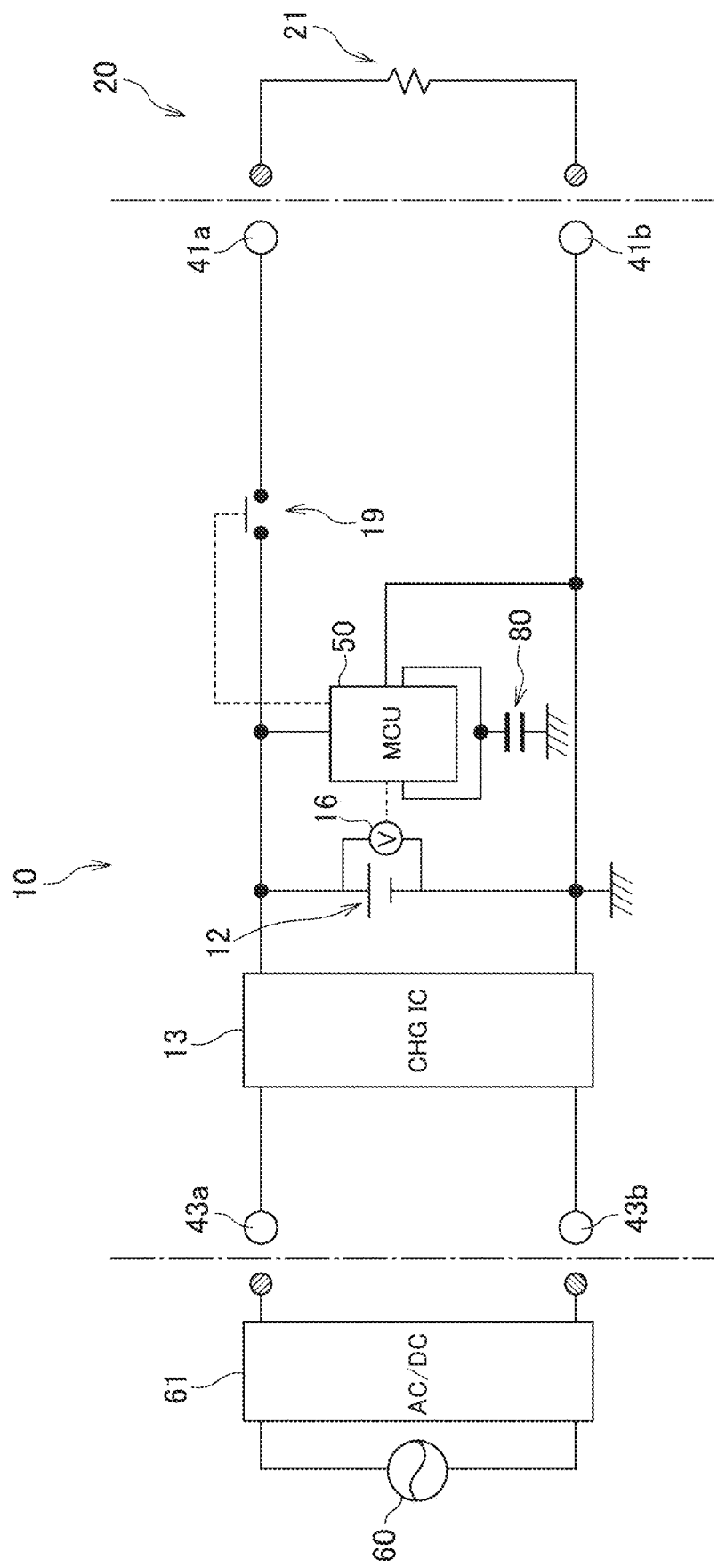
FIG. 5 is a schematic diagram showing a circuit configuration of the power supply unit in the aerosol suction device of FIG. 1.

Next, an electric circuit of the power supply unit 10 will be described with reference to FIG. 5.

The power supply unit 10 includes the power supply 12, a positive electrode side discharge terminal 41*a* and a negative electrode side discharge terminal 41*b* that constitute the discharge terminal 41, a positive electrode side charging terminal 43*a* and a negative electrode side charging terminal 43*b* that constitute the charging terminal 43, the controller 50 connected between a positive electrode side of the power supply 12 and the positive electrode side discharge terminal 41a and between a negative electrode side of the power supply 12 and the negative electrode side discharge terminal 41b, the charger 13 disposed on a power transmission path between the charging terminal 43 and the power supply 12, the voltage sensor 16 connected in parallel with the power supply 12, a switch 19 disposed on a power transmission path between the power supply 12 and the discharge terminal 41, and the electrostatic capacitance sensor 80 connected to the controller 50. The switch 19 is configured with, for example, a MOSFET, and is opened and closed by the controller 50 adjusting a gate voltage.

(Controller)

As shown in FIG. 6, the controller 50 includes an aerosol generation request detector 51, a liquid detector 52, a power controller 53, and a notification controller 54.

The aerosol generation request detector 51 detects an aerosol generation request based on an output result of the intake sensor 15. The intake sensor 15 outputs a value of a pressure change in the power supply unit 10 caused by the user's suction through the suction port 32. The intake sensor 15 is, for example, a pressure sensor that outputs an output value (for example, a voltage value or a current value) corresponding to an atmospheric pressure that changes in accordance with a flow rate of air suctioned from the air intake port 11c toward the suction port 32 (that is, a puff operation of the user).

Based on an output of the electrostatic capacitance sensor 80, the liquid detector 52 detects leakage of a liquid inside the power supply unit case 11 (hereinafter, referred to as liquid leakage detection), or detects entering of the liquid into the power supply unit case 11 (hereinafter, referred to as liquid entering detection). Further, the liquid detector 52 prohibits charging/discharging of the power supply 12 in accordance with a detection result. According to such a liquid detector 52, it is possible to avoid an influence of the leakage of the liquid, the entering of the liquid, or the like on an operation of the aerosol suction device 1. Further, the electrostatic capacitance sensor 80 is used, so that the leakage of the liquid and the entering of the liquid can be accurately detected with an inexpensive configuration. A specific processing procedure of the liquid detector 52 will be described later.

The notification controller 54 controls the notification unit 45 so as to notify various pieces of information. For example, the notification controller 54 controls the notification unit 45 so as to notify a replacement timing of the second cartridge 30 in response to detection of the replacement timing of the second cartridge 30. The notification controller 54 notifies the replacement timing of the second cartridge 30 based on the number of puff operations or accumulated energization time for the load 21 that are stored in the memory 18. The notification controller 54 is not limited to the notification of the replacement timing of the second cartridge 30, and may notify a replacement timing of the first cartridge 20, a replacement timing of the power supply 12, a charging timing of the power supply 12, and the like.

The power controller 53 controls discharge of the power supply 12 via the discharge terminal 41 by turning ON/OFF the switch 19 when the aerosol generation request detector 51 detects an aerosol generation request.

The power controller 53 performs control such that an amount of an aerosol generated by the load 21 atomizing the aerosol source falls within a desired range, in other words, performs control such that an amount of power supplied from the power supply 12 to the load 21 falls within a certain range. Specifically, the power controller 53 controls ON/OFF of the switch 19 by, for example, pulse width modulation (PWM) control. Instead, the power controller 53 may control ON/OFF of the switch 19 by pulse frequency modulation (PFM) control.

The power controller 53 may stop power supply from the power supply 12 to the load 21 when a predetermined period has elapsed after the power supply to the load 21 is started. In other words, the power controller 53 stops the power supply from the power supply 12 to the load 21 when a puff period exceeds a predetermined period even within the puff period during which the user actually performs the puff operation. The predetermined period is determined in order to prevent a variation in the puff period of the user. The power controller 53 controls an ON/OFF duty ratio of the switch 19 in a single puff operation in accordance with a power storage amount of the power supply 12. For example, the power controller 53 controls an on-time interval (pulse interval) for supplying power from the power supply 12 to the load 21, or controls an on-time length (pulse width) for supplying power from the power supply 12 to the load 21.

The power controller 53 detects an electrical connection between the charging terminal 43 and the external power supply 60 and controls charging of the power supply 12 via the charger 13.

(Board Configuration)

Figure 7:
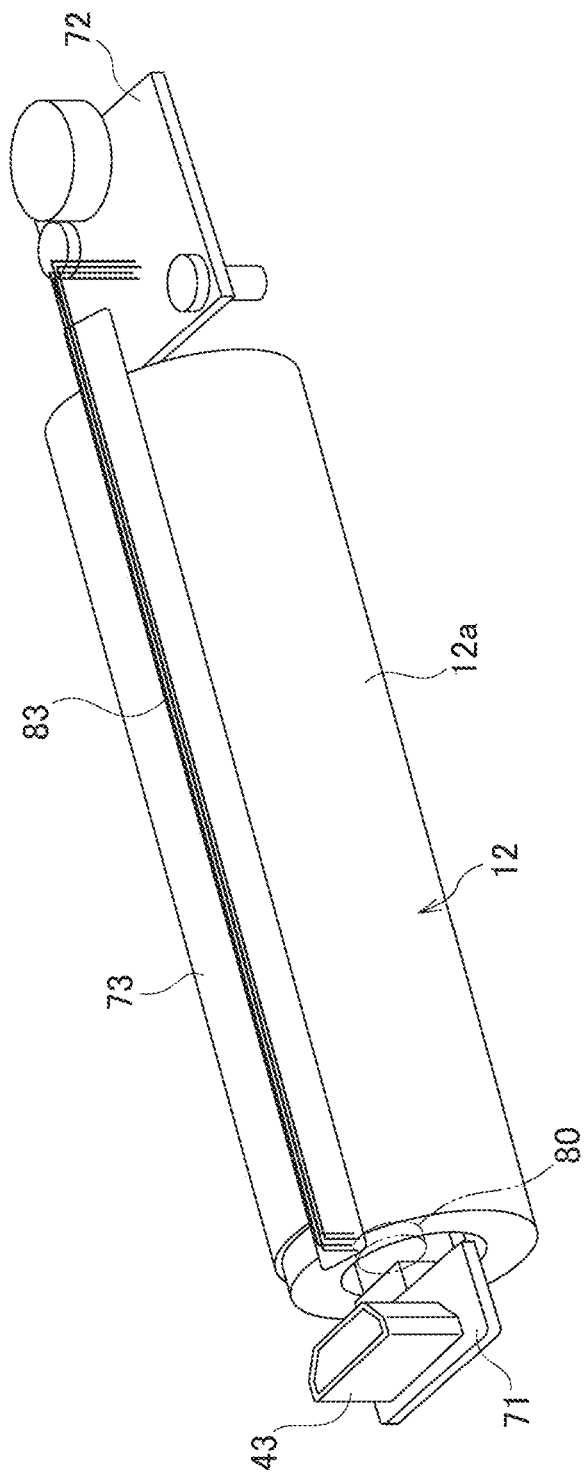
FIG. 7 is a perspective view of main parts showing a board configuration of the power supply unit in the aerosol suction device of FIG. 1.

As shown in FIG. 7, the power supply unit 10 includes a first circuit board 71 provided with the charging terminal 43 and the like, a second circuit board 72 provided with the controller 50, the charger 13, the switch 19 and the like, and a conductive member 73 that electrically connects the first circuit board 71 to the second circuit board 72. The conductive member 73 of the present embodiment is configured using a flexible printed circuit board (FPCB), but may be configured with a conductive wire.

The first circuit board 71 and the second circuit board 72 are arranged apart from each other. Specifically, the first circuit board 71 is provided on one end side in the length direction of the power supply 12 (longitudinal direction A), the second circuit board 72 is provided on the other end side in the length direction of the power supply 12 (longitudinal direction A), and the first circuit board 71 and the second circuit board 72 are electrically connected to each other via the conductive member 73 that extends in the length direction of the power supply 12 along a peripheral surface of the power supply 12.

(Liquid Leakage Detection)

Next, the liquid leakage detection by the controller 50 (liquid detector 52) will be described with reference to FIGS. 7, 8, 9A, 9B, and 9C. In the present embodiment, an electrolytic solution of the power supply 12 is assumed as a liquid leaked inside the power supply unit case 11. It should be noted that in the following description, the term "electrolytic solution" may indicate either an ionic liquid or a flame retardant organic solvent.

The power supply 12 may include an electrolyte other than an electrolytic solution. As an example, the power supply 12 may include both a solid or gel-shaped solid electrolyte and an electrolytic solution. Further, the electrolytic solution may be a mixed solution containing a plurality of liquids. Further, a lithium salt or the like for improving performance of the power supply 12 may be added as an additive to the electrolytic solution.

The electrostatic capacitance sensor 80 is a sensor that detects an object, a fluid, or the like based on a change in an electrostatic capacitance that occurs between a sensor electrode 81 and a GND potential, and detects the electrolytic solution leaked from the power supply 12 in the present embodiment. The electrostatic capacitance sensor 80 of the present embodiment constitutes, between the electrode 81 and the GND potential, a pseudo capacitor by sandwiching a first porous body 82 that absorbs the electrolytic solution so as to guide the electrolytic solution to the electrode 81, and measures an electrostatic capacitance of the capacitor by the controller 50. For example, the controller 50 charges and discharges the capacitor including the electrostatic capacitance sensor 80, and measures an electrostatic capacitance based on a time required for the charging and discharging. According to such an electrostatic capacitance sensor 80, when the first porous body 82 absorbs the electrolytic solution, an electrostatic capacitance is changed. Therefore, the controller 50 can accurately detect the electrolytic solution leaked from the power supply 12. Further, since the electrode 81 can be configured with a metal plate and the first porous body 82 can be configured with a cotton sheet, a sponge, absorbent cotton, or the like, the electrolytic solution leakage of the power supply 12 can be detected with an inexpensive configuration. The electrode 81 and the first porous body 82 may be unitized so as to form an electrostatic capacitance sensor unit. Instead of the pseudo capacitor including only one electrode 81, the electrostatic capacitance sensor 80 may be configured with a capacitor including two facing electrodes 81.

It is desirable that the electrostatic capacitance sensor 80 is disposed in the power supply 12 at a location where the electrolytic solution leaks easily. Generally, in the power supply 12, the electrolytic solution leakage easily occurs in the vicinity of the tab 12b and the safety valve. Therefore, it is desirable that at least a part of the first porous body 82 is disposed so as to abut the tab 12b and the safety valve or is disposed in the vicinity of the tab 12b and the safety valve. Accordingly, when the electrolytic solution leakage occurs in the vicinity of the tab 12b and the safety valve of the power supply 12, the electrolytic solution leakage can be effectively and rapidly detected. At least a part of the first porous body 82 being disposed so as to abut the tab 12b and the safety valve obviously means that the entire first porous body 82 abuts the tab 12b and the safety valve, and means that a part of the first porous body 82 (for example, arm portion) extends toward the tab 12b and the safety valve and abuts the tab 12b and the safety valve while the first porous body 82 is separated from the tab 12b and the safety valve. Further, at least a part of the first porous body 82 being disposed in the vicinity of the tab 12b and the safety valve obviously means that the entire first porous body 82 is positioned in the vicinity of the tab 12b and the safety valve, and means that a part of the first porous body 82 (for example, arm portion) is positioned in the vicinity of the tab 12b and the safety valve while the first porous body 82 is separated from the tab 12b and the safety valve. The vicinity is a position including at least a position that can be in contact with an electrolytic solution when the electrolytic solution leaks.

In a case where the entire first porous body 82 is disposed so as to abut the tab 12b and the safety valve or disposed in the vicinity of the tab 12b and the safety valve, when the electrolytic solution leakage occurs, an electrostatic capacitance of the electrostatic capacitance sensor 80 is changed rapidly, so that the electrolytic solution leakage can be detected rapidly. When a part of the first porous body 82 extends toward the tab 12b and the safety valve and abuts the tab 12b and the safety valve while the first porous body 82 is separated from the tab 12b and the safety valve, or when a part of the first porous body 82 is positioned in the vicinity of the tab 12b and the safety valve, since the electrostatic capacitance sensor 80 can be disposed apart from the tab 12b and the safety valve, a degree of freedom in disposing electronic components in the power supply unit case 11 is improved. As a result, the power supply unit 10 can be downsized.

As shown in FIG. 7, when the electrostatic capacitance sensor 80 is disposed on one end side of the power supply 12 and the controller 50 (second circuit board 72) is disposed on the other end side of the power supply 12, it is desirable to incorporate the conductive wire 83 that connects the electrostatic capacitance sensor 80 to the controller 50 into the conductive member 73 that is a flexible printed circuit board. Accordingly, wiring of the power supply unit 10 can be saved.

In a case of the power supply unit 10 including a power supply holder (not shown) that is disposed inside the power supply unit case 11 and holds the power supply 12, it is desirable that at least a part of the first porous body 82 is disposed between the power supply 12 and the power supply holder. As a result of intensive studies by the inventors of the present application, it has been found that the power supply holder generates an inevitable gap with the power supply 12 and the electrolytic solution easily enters the gap. Accordingly, even when the electrolytic solution leaks between the power supply 12 and the power supply holder, the electrolytic solution leakage can be detected. In addition to the first porous body 82, the electrostatic capacitance sensor 80 may be disposed between the power supply 12 and the power supply holder. The power supply holder may be electrically conductive or non-conductive.

Figure 9A:
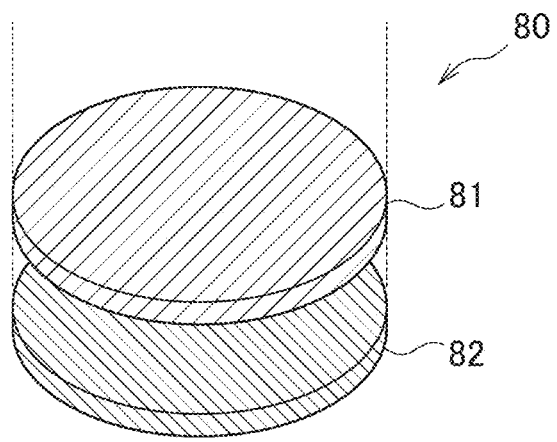
FIG. 9A is an illustrative diagram showing a relationship between an electrode of the electrostatic capacitance sensor and a first porous body (first embodiment).

As shown in FIG. 9A, in the electrostatic capacitance sensor 80, an area of the first porous body 82 on a surface facing the electrode 81 can be equal to an area of the electrode 81. Accordingly, wherever the electrolytic solution is absorbed in the first porous body 82, the electrolytic solution leakage can be detected. The area of the first porous body 82 on the surface facing the electrode 81 means the area of the first porous body 82 included in a region where the electrode 81 is projected in parallel with the first porous body 82, as indicated by a dotted line in FIG. 9A. It should be noted that when a part of the first porous body 82 extends toward the tab 12b and the safety valve and abuts the tab 12b and the safety valve while the first porous body 82 is separated from the tab 12b and the safety valve, or a part of the first porous body 82 is positioned in the vicinity of the tab 12b and the safety valve, the part of the first porous body 82 is not included in the region where the electrode 81 is projected in parallel with the first porous body 82. This also applies to embodiments shown in FIGS. 9B and 9C.

Figure 9B:
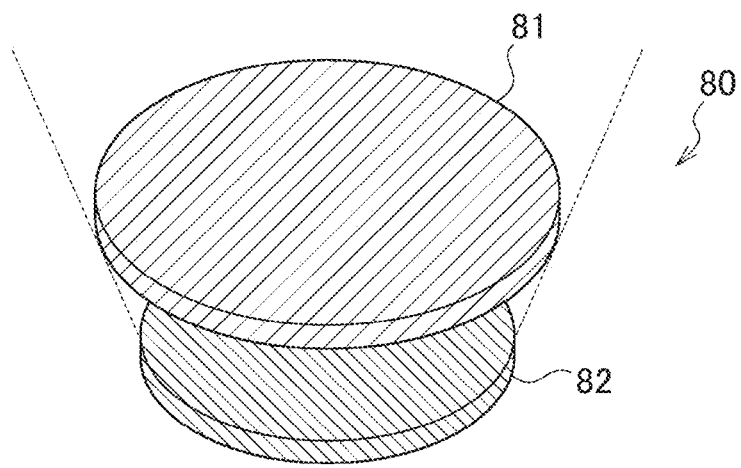
FIG. 9B is an illustrative diagram showing a relationship between the electrode of the electrostatic capacitance sensor and the first porous body (second embodiment).

As shown in FIG. 9B, in the electrostatic capacitance sensor 80, an area of the first porous body 82 on a surface facing the electrode 81 can be smaller than an area of the electrode 81. Accordingly, even when there are some errors in sizes of the electrode 81 and the first porous body 82, electrolytic solution leakage can be detected. Further, as compared with the electrode 81 having rigidity because the electrode 81 is formed of metal, a shape of the porous first porous body 82 is easily deformed by a slight external force. Therefore, it is preferable to form the electrode 81 and the first porous body 82 as shown in FIG. 9B.

Figure 9C:
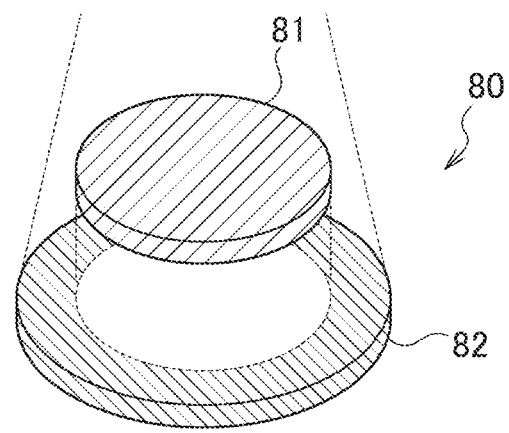
FIG. 9C is an illustrative diagram showing a relationship between the electrode of the electrostatic capacitance sensor and the first porous body (third embodiment).

As shown in FIG. 9C, in the electrostatic capacitance sensor 80, an area of the first porous body 82 on a surface facing the electrode 81 can be larger than an area of the electrode 81. Accordingly, there is a location where an output of the electrostatic capacitance sensor 80 is not changed even when the first porous body 82 absorbs an electrolytic solution.

It is preferable that an electrostatic capacitance of the electrostatic capacitance sensor 80 is changed, based on the electrolytic solution absorbed by the first porous body 82, with a significant difference. Further, it is preferable that the first porous body 82 rapidly transports the absorbed electrolytic solution to a location where the electrostatic capacitance of the electrostatic capacitance sensor 80 is changed. Under such a background, physical properties such as a size of the first porous body 82 are preferably limited. As a result, the first porous body 82 may not be able to absorb the electrolytic solution depending on an amount of the leaked electrolytic solution. It should be noted that the electrolytic solution that cannot be absorbed by the first porous body 82 includes one that cannot be completely absorbed while being once in contact with the first porous body 82 and one that cannot be in contact with the first porous body 82.

Figure 8:
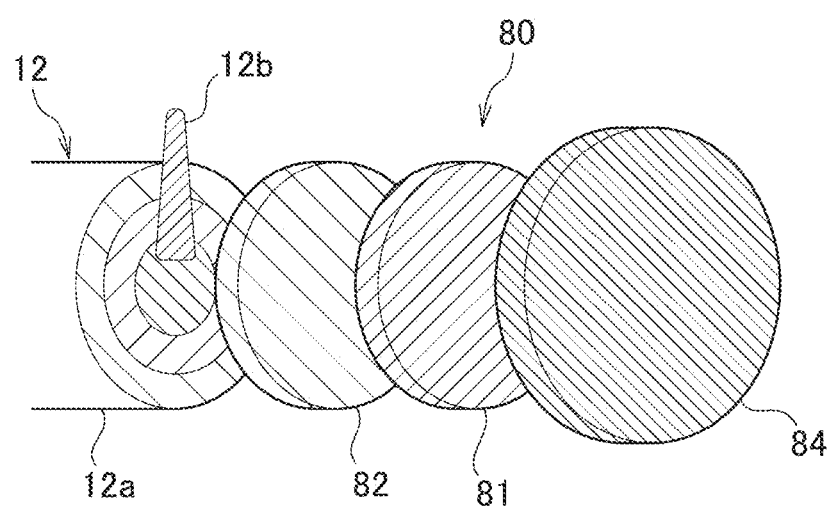
FIG. 8 is an illustrative diagram illustrating an electrostatic capacitance sensor of the power supply unit in the aerosol suction device of FIG. 1.

Therefore, as shown in FIGS. 7 and 8, when the electrostatic capacitance sensor 80 is disposed in the vicinity of the circuit boards 71 and 72, it is desirable to provide a second porous body 84 between the electrostatic capacitance sensor 80 (electrode 81) and the circuit boards 71 and 72. Accordingly, the second porous body 84 can absorb the electrolytic solution that cannot be absorbed by the first porous body 82. As a result, the circuit boards 71 and 72 can be protected from the electrolytic solution that cannot be absorbed by the first porous body 82.

As described above, the physical properties of the first porous body 82 are preferably limited, so that a role of the first porous body 82 is fulfilled. On the other hand, since a role of the second porous body 84 is to protect the circuit boards 71 and 72, physical properties are not limited as in the case of the first porous body 82. When an attempt is made to protect other electronic components such as a circuit board from the leaked electrolytic solution while rapidly detecting the electrolytic solution leakage, the first porous body 82 and the second porous body 84 preferably have the following differences.

It is desirable that an area of the second porous body 84 on a surface facing the electrode 81 is larger than the area of the electrode 81. Accordingly, the circuit boards 71 and 72 can be more effectively protected from the electrolytic solution. The area of the second porous body 84 is not limited by the relationship with the area of the electrode 81 as described with reference to FIGS. 9A to 9C. Therefore, the electrolytic solution that cannot be absorbed by the first porous body 82 can be absorbed by the second porous body 84 having a large area.

It is desirable that the physical properties of the first porous body 82 and the physical properties of the second porous body 84 are different. Accordingly, the physical properties of the first porous body 82 and the second porous body 84 are changed, so that appropriate porous bodies can be selected in accordance with requirements required for the respective porous bodies 82 and 84.

For example, the second porous body 84 has physical properties that can hold a larger amount of liquid than the first porous body 82. Accordingly, the circuit boards 71 and 72 can be more effectively protected from the electrolytic solution. When the first porous body 82 has the physical properties that can hold a large amount of liquid, transportation of the absorbed electrolytic solution to the location where the electrostatic capacitance of the electrostatic capacitance sensor 80 is changed may be delayed. On the other hand, for the second porous body 84, a limitation is not imposed on a liquid-holdable amount. Therefore, the electrolytic solution that cannot be absorbed by the first porous body 82 can be absorbed by the second porous body 84 having a large area.

Further, the first porous body 82 has physical properties that can transport liquid faster than the second porous body 84. Accordingly, the electrolytic solution leakage can be detected earlier. Since a general porous body has a trade-off relationship between a liquid transportation speed and a liquid-holdable amount, the physical properties of the second porous body 84 are designed such that the liquid-holdable amount is prioritized over the liquid transportation speed. Accordingly, while detecting the electrolytic solution leakage early, the electrolytic solution that cannot be absorbed by the first porous body 82 can be absorbed by the second porous body 84 having a large area.

A thickness that is a size of the second porous body 84 in a thickness direction is larger than a thickness that is a size of the first porous body 82 in a thickness direction. In other words, the second porous body 84 is thicker than the first porous body 82. Accordingly, since the first porous body 82 is thinner, the electrolytic solution leakage can be detected earlier. On the other hand, since the second porous body 84 is thicker, a large amount of electrolytic solution can be held. Accordingly, while detecting the electrolytic solution leakage early, the electrolytic solution that cannot be absorbed by the first porous body 82 can be absorbed by the second porous body 84 having a large area.

An area of a main surface of the second porous body 84 is larger than an area of a main surface of the first porous body 82. In other words, the second porous body 84 is larger than the first porous body 82. Accordingly, since the second porous body 84 can hold a large amount of electrolytic solution, the circuit boards 71 and 72 can be more effectively protected from the electrolytic solution that cannot be absorbed by the first porous body 82.

Further, open porosity of the second porous body 84 is higher than that of the first porous body 82. Accordingly, since the second porous body 84 can hold a large amount of electrolytic solution, the circuit boards 71 and 72 can be more effectively protected from the electrolytic solution that cannot be absorbed by the first porous body 82.

Although the protection of the circuit boards 71 and 72 by the second porous body 84 has been described in the embodiment described above, a target protected by the second porous body 84 is not limited to a circuit board. In another example, an electronic component such as a sensor, a resistor, a coil that is separated from the circuit boards may be protected by the second porous body 84. As another example, the second porous body 84 may be used such that the electrolytic solution does not leak from openings provided in the power supply unit case 11.

(Liquid Entering Detection) Next, the liquid entering detection by the controller 50 (liquid detector 52) will be described. In the present embodiment, a liquid that enters into the power supply unit case 11 is assumed to be water that enters during submersion. A structure of the electrostatic capacitance sensor 80 used for the liquid entering detection is substantially the same as the structure of the electrostatic capacitance sensor 80 used for the liquid leakage detection. Also in the electrostatic capacitance sensor 80 used for the liquid entering detection, it is preferable that the relationship between the electrode 81 and the first porous body 82 described with reference to FIGS. 9A to 9C is established. The electrostatic capacitance sensor 80 used for the liquid entering detection preferably also includes both the first porous body 82 and the second porous body 84.

The controller 50 detects, based on the output of the electrostatic capacitance sensor 80, entering of water from openings K1 to K5 provided in the power supply unit case 11. For example, it is desirable that at least a part of the first porous body 82 that guides water toward the electrode 81 of the electrostatic capacitance sensor 80 is disposed so as to abut the openings K1 to K5 or is disposed in the vicinity of the openings K1 to K5. Accordingly, entering of water can be effectively detected when the water enters from the openings K1 to K5. At least a part of the first porous body 82 being disposed so as to abut the openings K1 to K5 obviously means that the entire first porous body 82 abuts the openings K1 to K5, and means that a part of the first porous body 82 (for example, arm portion) extends toward the openings K1 to K5 and abuts the openings K1 to K5 while the first porous body 82 is separated from the openings K1 to K5. Further, at least a part of the first porous body 82 being disposed in the vicinity of the openings K1 to K5 obviously means that the entire first porous body 82 is positioned in the vicinity of the openings K1 to K5, and means that a part of the first porous body 82 (for example, arm portion) is positioned in the vicinity of the openings K1 to K5 while the first porous body 82 is separated from the openings K1 to K5.

The vicinity is a position that can be in contact with water when the water enters.

In a case where the entire first porous body 82 is disposed so as to abut the openings K1 to K5 or is disposed in the vicinity of the openings K1 to K5, when submersion occurs, the electrostatic capacitance of the electrostatic capacitance sensor 80 is rapidly changed, so that the submersion can be rapidly detected. When a part of the first porous body 82 extends toward the openings K1 to K5 and abuts the openings K1 to K5 while the first porous body 82 is separated from the openings K1 to K5, or a part of the first porous body 82 is positioned in the vicinity of the openings K1 to K5, since the electrostatic capacitance sensor 80 can be disposed apart from the openings K1 to K5, a degree of freedom in disposing an electronic component in the power supply unit case 11 is improved. As a result, the power supply unit 10 can be downsized.

Figure 4:
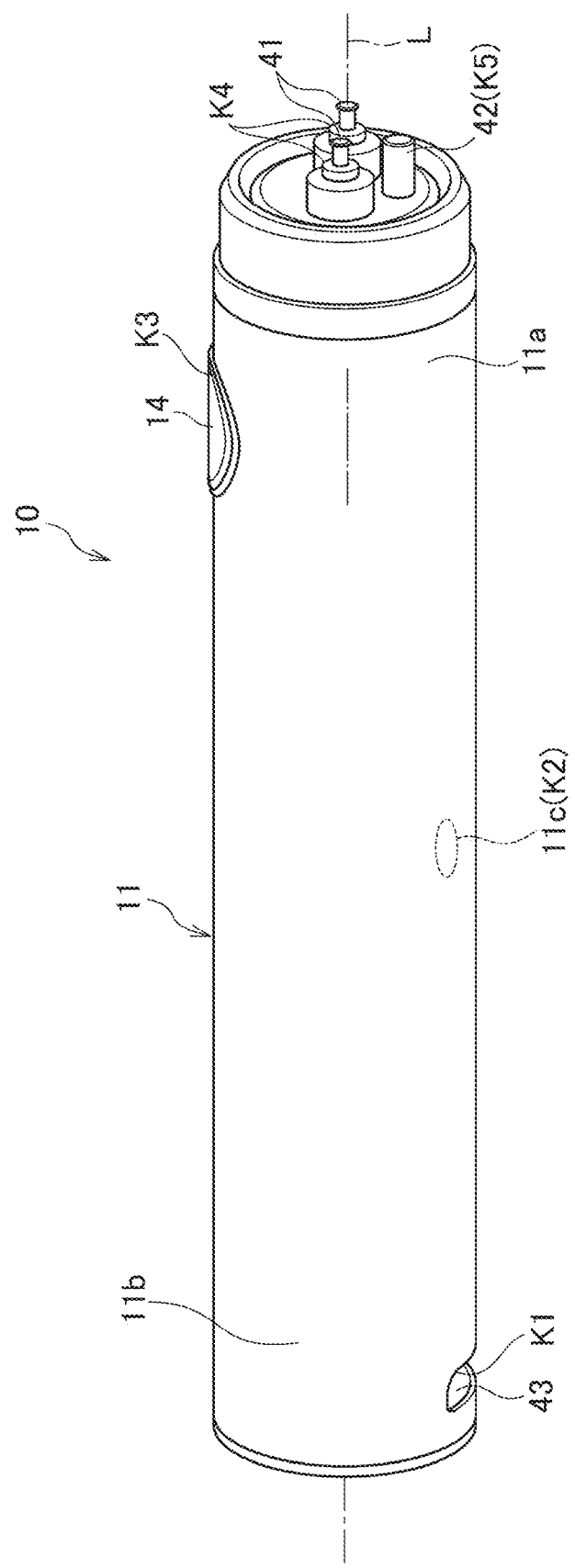
FIG. 4 is a perspective view of the power supply unit in the aerosol suction device of FIG. 1.

As shown in FIG. 4, the opening K1 is formed in the power supply unit case 11 and around the charging terminal 43. When the electrostatic capacitance sensor 80 is disposed in the vicinity of the opening K1 in the power supply unit case 11, entering of water from around the charging terminal 43 can be detected. Further, an influence of the entering of the water on the operation of the aerosol suction device 1 can be avoided.

The opening K2 is the air intake port 11c. When the electrostatic capacitance sensor 80 is disposed in the vicinity of the opening K2 in the power supply unit case 11, entering of water from the air intake port 11c can be detected. Further, an influence of the entering of the water on the operation of the aerosol suction device 1 can be avoided.

The opening K3 is formed in the power supply unit case 11 and around the operation unit 14. When the electrostatic capacitance sensor 80 is disposed in the vicinity of the opening K3 in the power supply unit case 11, entering of water from around the operation unit 14 can be detected. Further, an influence of the entering of the water on the operation of the aerosol suction device 1 can be avoided.

The opening K4 is formed in the power supply unit case 11 and around the discharge terminal 41. When the electrostatic capacitance sensor 80 is disposed in the vicinity of the opening K4 in the power supply unit case 11, entering of water from around the discharge terminal 41 can be detected. Further, an influence of the entering of the water on the operation of the aerosol suction device 1 can be avoided.

The opening K5 is the air supply portion 42. When the electrostatic capacitance sensor 80 is disposed in the vicinity of the opening K5 in the power supply unit case 11, entering of water from the air supply portion 42 can be detected. Further, an influence of the entering of the water on the operation of the aerosol suction device 1 can be avoided.

Among the openings K1 to K5, the opening K2 and the opening K5 are positively provided in the power supply unit case 11 as air flow paths. Therefore, the opening K2 and the opening K5 themselves may become water entering paths. On the other hand, the openings K1, K3, and K4 are provided for assembling separate components to the power supply unit case 11. Therefore, to be precise, in the openings K1, K3, and K4, buffers for absorbing product tolerances of the components to be assembled to the power supply unit case 11 may become water entering paths.

Positions of the electrostatic capacitance sensor 80 and the first porous body 82 are adjusted, so that both the liquid leakage detection and the liquid entering detection can be performed. Both the liquid leakage detection and the liquid entering detection are performed, so that safety of the power supply unit 10 and the aerosol suction device 1 can be improved.

(Control Example)

Next, specific control procedures of the controller 50 will be described with reference to FIGS. 10 to 14. In the present disclosure, three control examples are shown as the specific control procedures of the controller 50.

First, Table 1 shows typical dielectrics among dielectrics that can be present inside the aerosol suction device 1 and relative permittivities thereof.

TABLE 1

| Dielectric | Relative permittivity $\varepsilon_r$ | Application |
| --- | --- | --- |
| Ethylene carbonate (EC) | 90.0 | Electrolytic solution |
| Water | 80.4 | Aerosol source |
| Propylene carbonate (PC) | 65.0 | Electrolytic solution |
| Glycerin (G) | 47.0 | Aerosol source |
| Dimethyl sulfoxide (DMSO) | 46.7 | Electrolytic solution |
| Propylene glycol (PG) | 32.0 | Aerosol source |
| Dimethyl carbonate (DMC) | 3.1 | Electrolytic solution |
| Ethyl methyl carbonate (EMC) | 2.9 | Electrolytic solution |
| Diethyl carbonate | 2.8 | Electrolytic solution |
| Air | 1.0 | Atmospheric atmosphere |

Figure 12:
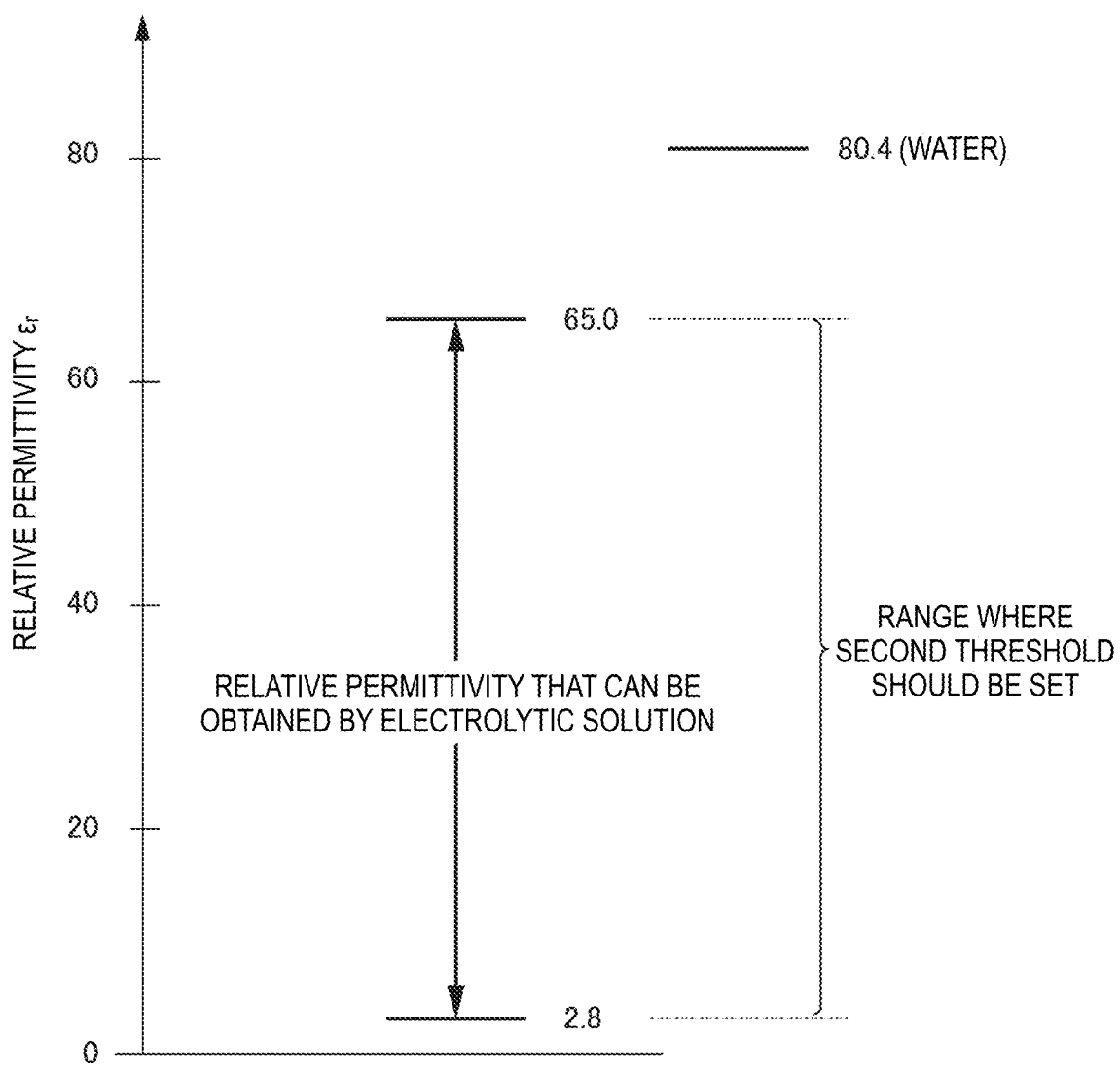
FIG. 12 is an illustrative diagram of a threshold used in the second control example of FIG. 11.
Figure 14:
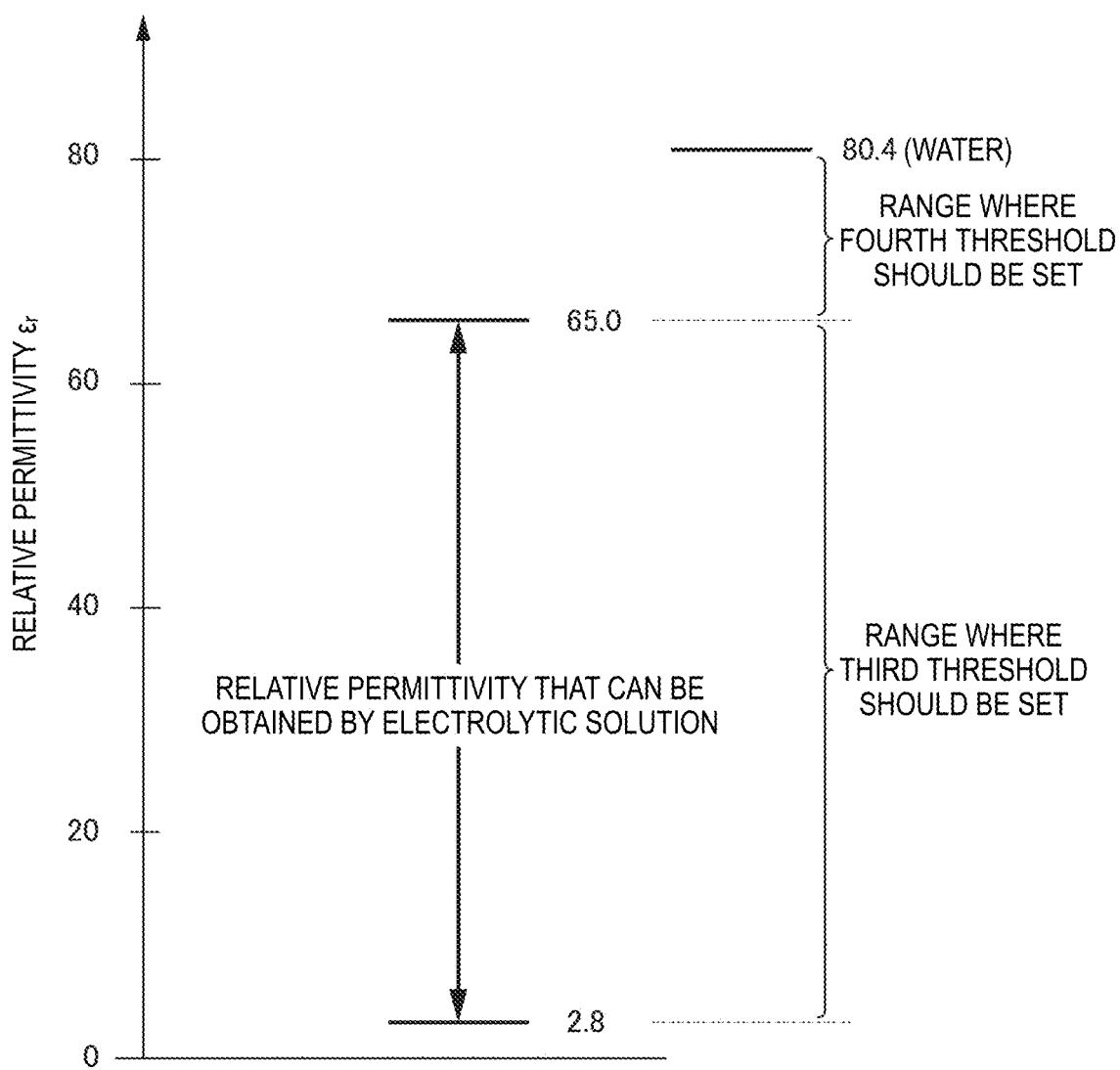
FIG. 14 is an illustrative diagram of thresholds used in the third control example of FIG. 13.

In FIGS. 12 and 14, it is assumed that any one of propylene carbonate (PC), dimethyl sulfoxide (DMSO), dimethyl carbonate (DMC), ethyl methyl carbonate (EMC) and diethyl carbonate, or a mixed solution thereof is used as an electrolytic solution. It is known that a relative permittivity or permittivity of the mixed solution is obtained by adding relative permittivities or permittivities of the respective solutions that constitute the mixed solution in accordance with ratios thereof. Therefore, 2.8 to 65.0 is shown as a relative permittivity that can be obtained by the electrolytic solution. Further, 80.4 is a relative permittivity that can be obtained by water at room temperature, and less than 2.8 is shown as a relative permittivity in the absence of a liquid such as an electrolytic solution or water. However, the present disclosure is not limited thereto. An obtainable value of the relative permittivity can be set in accordance with components of the electrolytic solution and the like.

A relative permittivity that can be obtained by the electrolytic solution may be obtained experimentally, or may be obtained by adding known relative permittivities of the liquids that constitute the mixed solution in accordance with a composition ratio thereof. In the following description, a permittivity may be used instead of a relative permittivity.

Figure 10:
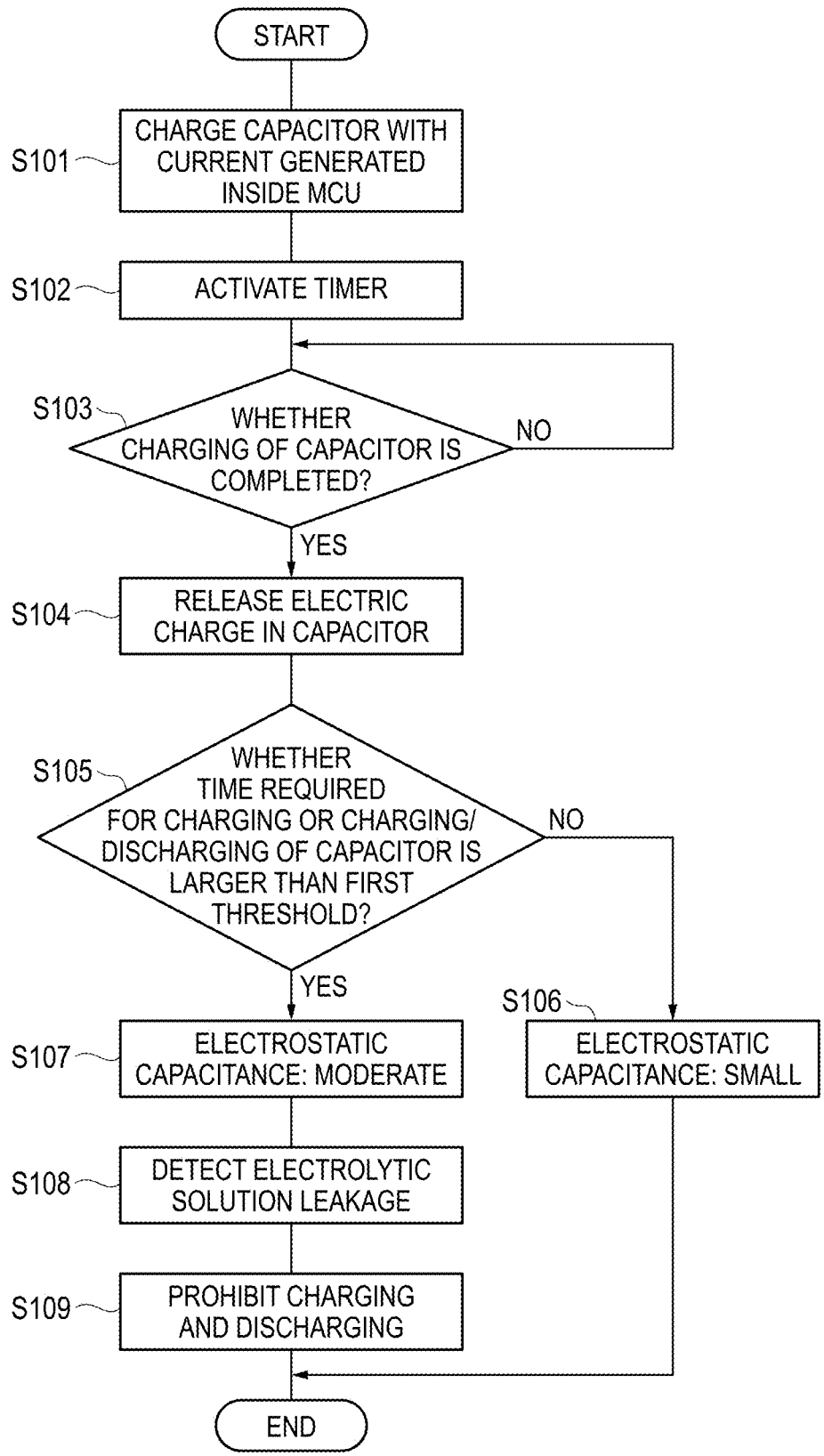
FIG. 10 is a flowchart showing a first control example of the power supply unit in the aerosol suction device of FIG. 1.

In a case of control example 1 shown in FIG. 10, the controller 50 detects leakage of the electrolytic solution based on a comparison between an output of the electrostatic capacitance sensor 80 and a first threshold (see FIG. 14: equivalent to a third threshold) based on a permittivity of the electrolytic solution or a relative permittivity of the electrolytic solution.

Figure 11:
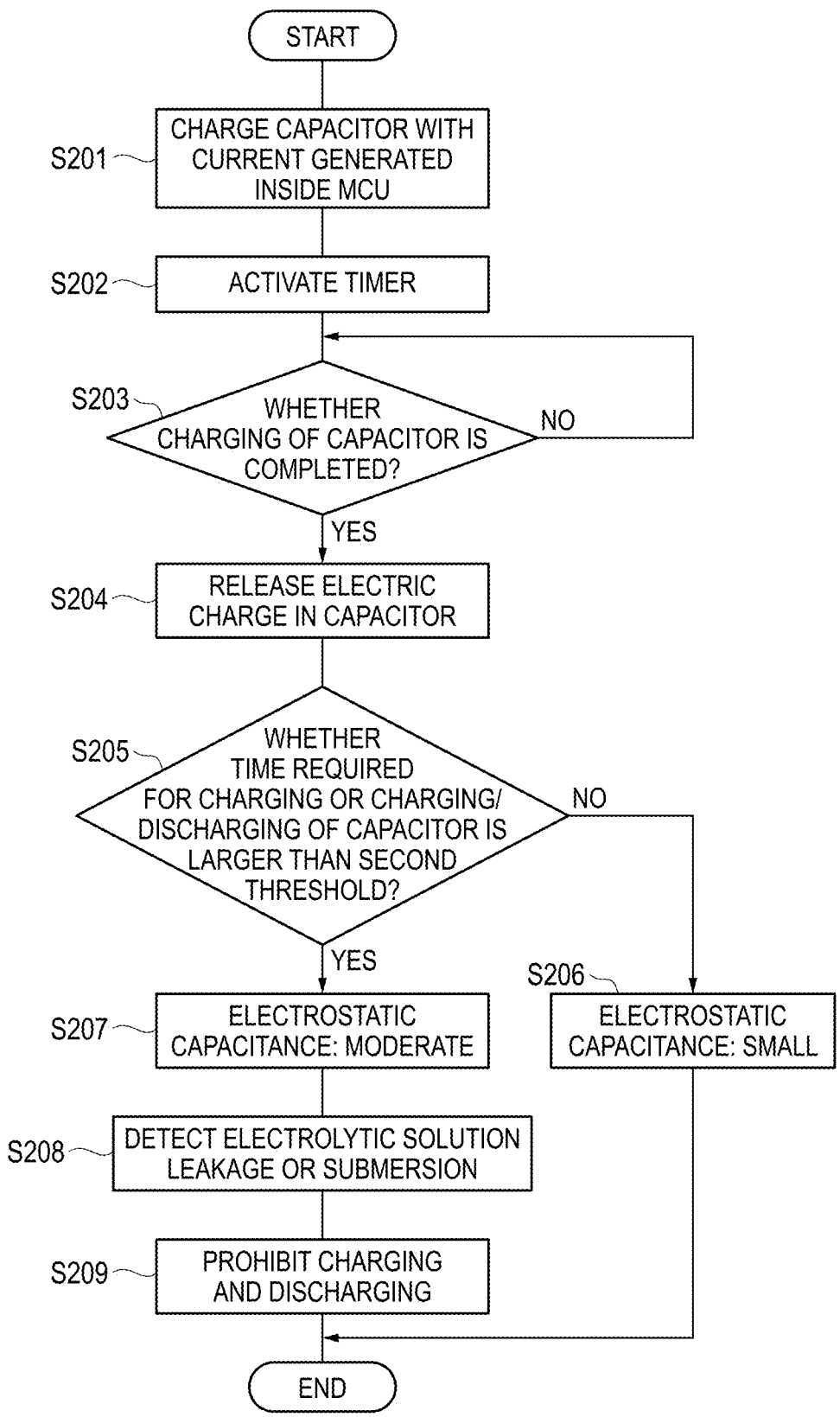
FIG. 11 is a flowchart showing a second control example of the power supply unit in the aerosol suction device of FIG. 1.

In a case of control example 2 shown in FIGS. 11 and 12, the controller 50 detects the leakage of the electrolytic solution and the entering of the water without making a distinction, based on a comparison between an output of the electrostatic capacitance sensor 80 and a second threshold (see FIG. 12) that is based on a permittivity equal to or smaller than a permittivity of the electrolytic solution and equal to or smaller than a permittivity of the water or that is based on a relative permittivity equal to or smaller than a relative permittivity of the electrolytic solution and equal to or smaller than a relative permittivity of the water. As another example, the second threshold may be set based on a smaller one between the permittivity of the electrolytic solution and the permittivity of the water, or based on a smaller one between the relative permittivity of the electrolytic solution and the relative permittivity of the water. In the embodiment shown in FIG. 12, since the permittivity and the relative permittivity of the electrolytic solution are smaller than the permittivity and the relative permittivity of the water, the second threshold may be set based on the permittivity or the relative permittivity of the electrolytic solution. By using ethylene carbonate (EC) for the electrolytic solution, when the permittivity and the relative permittivity of the water are smaller than the permittivity and the relative permittivity of the electrolytic solution, the second threshold may be set based on the permittivity or the relative permittivity of the water.

Figure 13:
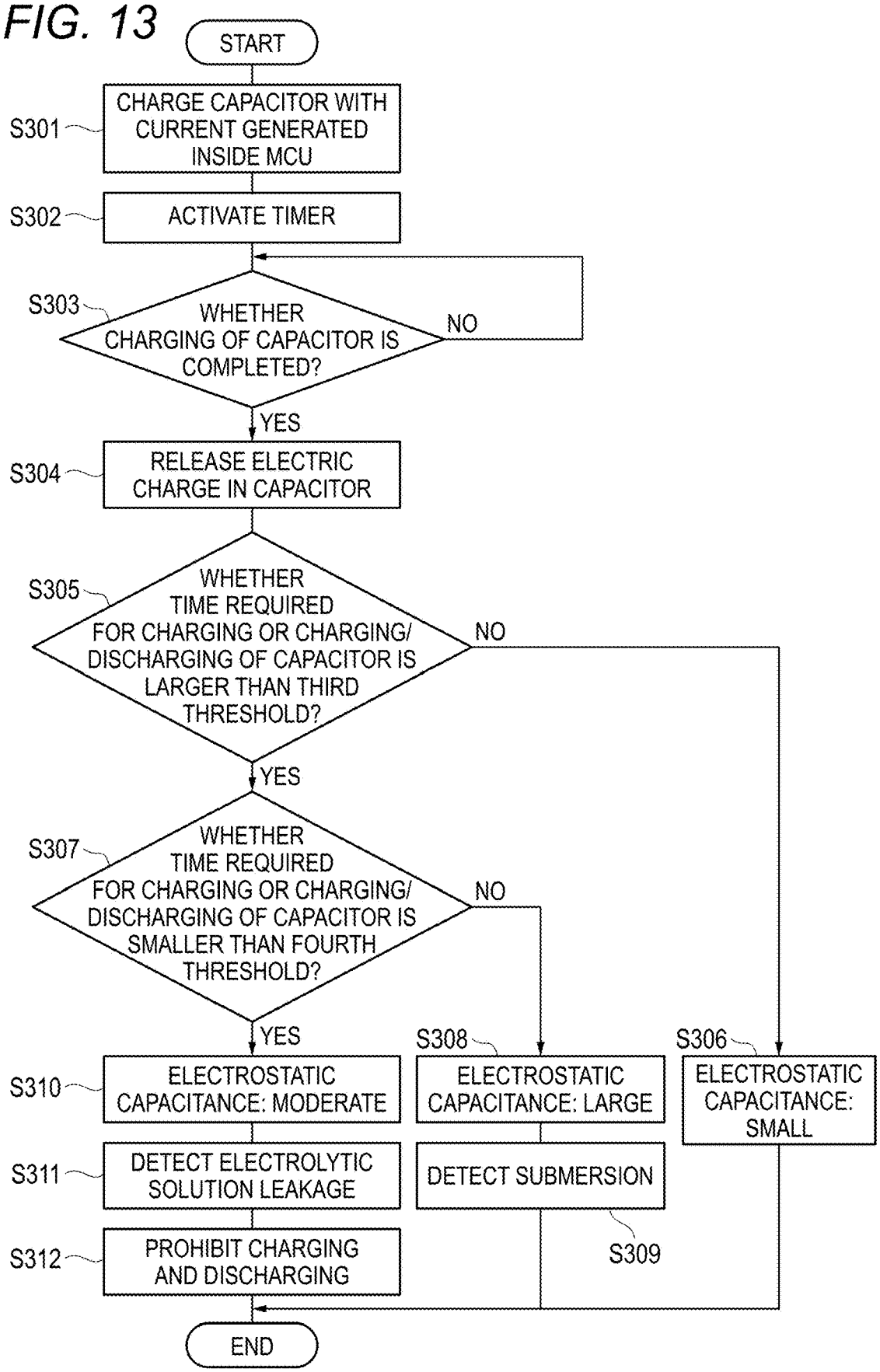
FIG. 13 is a flowchart showing a third control example of the power supply unit in the aerosol suction device of FIG. 1.

In a case of control example 3 shown in FIGS. 13 and 14, the controller 50 detects the leakage of the electrolytic solution based on an output of the electrostatic capacitance sensor 80 and the third threshold (see FIG. 14) that is based on a permittivity of the electrolytic solution or a relative permittivity of the electrolytic solution, and detects the entering of the water based on the output of the electrostatic capacitance sensor 80 and a fourth threshold (see FIG. 14) that is based on a permittivity of the water or a relative permittivity of the water.

In other words, an appropriate control example can be selected in accordance with a case where only the electrolytic solution leakage is detected, a case where the electrolytic solution leakage and the entering of the water are detected without making a distinction, and a case where the electrolytic solution leakage and the entering of the water are distinctively detected. Hereinafter, each control example will be described in detail.

Control Example 1

As shown in FIG. 10, when executing control example 1, the controller 50 first charges a capacitor (pseudo capacitor or capacitor configured by the electrostatic capacitance sensor 80) with a current generated inside the controller 50 (S101) and activates a timer (S102). Thereafter, the controller 50 repeatedly determines completion of charging of the capacitor (S103), releases electric charge accumulated in the capacitor when a determination result is YES, and obtains a time T required for charging or charging/discharging of the capacitor (S104).

Next, the controller 50 determines whether the time T is larger than the first threshold (S105). When a determination result is NO, the controller 50 determines that the electrostatic capacitance is small (S106), that is, determines that the electrolytic solution leakage does not occur, and then ends the single detection process. On the other hand, when YES is determined in step S105, the controller 50 determines that the electrostatic capacitance is moderate (S107), that is, determines that the electrolytic solution leakage has been detected (S108), and prohibits a discharging process from the power supply 12 to at least the load 21 and a charging process of the power supply 12 (S109). The notification controller 54 may control the notification unit 45 so as to notify at the same time as step S109 or before and after step S109 that the electrolytic solution leakage has been detected. Further, the controller 50 may perform control so as to prohibit all charging and discharging processes with respect to the power supply 12 in step S109. Further, the controller 50 may perform control so as to prohibit a discharging process from the power supply 12 to components other than the controller 50 in step S109.

When the determination result in step S105 is YES, the controller 50 may determine whether the time T is smaller than another threshold that is based on the permittivity of water or the relative permittivity of water. The controller 50 may advance the process to step S108 only when the determination result is YES. In this way, the electrolytic solution leakage can be accurately detected.

As described above, in the present embodiment, the first threshold may be set based on the permittivity of the electrolytic solution or the relative permittivity of the electrolytic solution. When the permittivity of the electrolytic solution or the relative permittivity of the electrolytic solution is known, the electrostatic capacitance of the electrostatic capacitance sensor 80 during the electrolytic solution leakage is derived. From the derived electrostatic capacitance, a time required for charging or charging/discharging of the capacitor during the electrolytic solution leakage may be derived, and this value may be used as the first threshold. As another example, the time required for charging or charging/discharging of the capacitor during the electrolytic solution leakage may be experimentally obtained and used as the first threshold. It is apparent that the first threshold set as described above is based on the permittivity of the electrolytic solution or the relative permittivity of the electrolytic solution.

In the present embodiment, in step S105, the time T is compared with the first threshold having a dimension of time. Alternatively, in step S105, the time T may be converted into a permittivity, and a converted value may be compared with a first threshold having a dimension of permittivity. Further, in step S105, the time T may be converted into a relative permittivity, and a converted value may be compared with a first threshold corresponding to the relative permittivity.

Control Example 2

As shown in FIG. 11, when executing control example 2, the controller 50 first charges the capacitor (pseudo capacitor or capacitor configured by the electrostatic capacitance sensor 80) with a current generated inside the controller 50 (S201) and activates a timer (S202). Thereafter, the controller 50 repeatedly determines completion of charging of the capacitor (S203), releases electric charge accumulated in the capacitor when a determination result is YES, and obtains the time T required for charging or charging/discharging of the capacitor (S204).

Next, the controller 50 determines whether the time T is larger than the second threshold (S205). When a determination result is NO, the controller 50 determines that the electrostatic capacitance is small (S206), that is, determines that the electrolytic solution leakage and the submersion do not occur, and then ends the single detection process. On the other hand, when YES is determined in step S205, the controller 50 determines that the electrostatic capacitance is moderate (S207), that is, determines that the electrolytic solution leakage or the submersion has been detected (S208), and prohibits a discharging process from the power supply 12 to at least the load 21 and a charging process of the power supply 12 (S209). The notification controller 54 may control the notification unit 45 so as to notify at the same time as step S209 or before and after step S209 that the electrolytic solution leakage has been detected. Further, the controller 50 may perform control so as to prohibit all charging and discharging processes with respect to the power supply 12 in step S209. Further, the controller 50 may perform control so as to prohibit a discharging process from the power supply 12 to components other than the controller 50 in step S209.

In the present embodiment, in step S205, the time T is compared with the first threshold having a dimension of time. Alternatively, in step S205, the time T may be converted into a permittivity, and a converted value may be compared with a first threshold having a dimension of permittivity. Further, in step S205, the time T may be converted into a relative permittivity, and a converted value may be compared with a first threshold corresponding to the relative permittivity.

As described above, the second threshold may be set based on the permittivity equal to or smaller than the permittivity of the electrolytic solution and equal to or smaller than the permittivity of water, or based on the relative permittivity equal to or smaller than the relative permittivity of the electrolytic solution and equal to or smaller than the relative permittivity of water. When permittivities or relative permittivities of the electrolytic solution and the water are known, electrostatic capacitances of the electrostatic capacitance sensor 80 during the electrolytic solution leakage and the submersion are derived. From the derived electrostatic capacitances, times required for charging or charging/discharging of the capacitor during the electrolytic solution leakage and the submersion may be derived, and a smallest value among these derived times may be used as the second threshold. As another example, the times required for charging or charging/discharging of the capacitor during the electrolytic solution leakage and the submersion may be experimentally obtained, and a smallest value among the obtained times may be used as the second threshold. It is apparent that the second threshold set as described above is based on the permittivity equal to or smaller than the permittivity of the electrolytic solution and equal to or smaller than the permittivity of the water, or based on the relative permittivity equal to or smaller than the relative permittivity of the electrolytic solution and equal to or smaller than the relative permittivity of the water.

The second threshold may be set based on a smaller one between the permittivity of the electrolytic solution and the permittivity of the water, or based on a smaller one between the relative permittivity of the electrolytic solution and the relative permittivity of the water. When permittivities or relative permittivities of the electrolytic solution and the water are known, electrostatic capacitances of the electrostatic capacitance sensor 80 during the electrolytic solution leakage and the submersion are derived. From the derived electrostatic capacitances, times required for charging or charging/discharging of the capacitor during the electrolytic solution leakage and the submersion may be derived, and a smallest value among these derived times may be used as the second threshold. As another example, the times required for charging or charging/discharging of the capacitor during the electrolytic solution leakage and the submersion may be experimentally obtained, and a smallest value among the obtained times may be used as the second threshold. It is apparent that the second threshold set as described above is based on a smaller one between the permittivity of the electrolytic solution and the permittivity of the water, or based on a smaller one between the relative permittivity of the electrolytic solution and the relative permittivity of the water.

(Control Example 3)

As shown in FIG. 13, when executing control example 3, the controller 50 first charges the capacitor (pseudo capacitor or capacitor configured by the electrostatic capacitance sensor 80) with a current generated inside the controller 50 (S301) and activates a timer (S302). Thereafter, the controller 50 repeatedly determines completion of charging of the capacitor (S303), releases electric charge accumulated in the capacitor when a determination result is YES, and obtains the time T required for charging or charging/discharging of the capacitor (S304).

Next, the controller 50 determines whether the time T is larger than the third threshold (S305). When a determination result is NO, the controller 50 determines that the electrostatic capacitance is small (S306), that is, determines that the electrolytic solution leakage and the submersion do not occur, and then ends the single detection process. On the other hand, when YES is determined in step S305, the controller 50 determines whether the time T is smaller than the fourth threshold (the fourth threshold is larger than the third threshold) (S307). When a determination result is NO, the controller 50 determines that the electrostatic capacitance is large (S308), that is, determines that the submersion has occurred (S309), and ends the single detection process. Further, when a determination result of step S307 is YES, the controller 50 determines that the electrostatic capacitance is moderate (S310), that is, determines that the electrolytic solution leakage has been detected (S311), and prohibits a discharging process from the power supply 12 to the load 21 and a charging process of the power supply 12 (S312). The notification controller 54 may control the notification unit 45 so as to notify at the same time as step S312 or before and after step S312 that the electrolytic solution leakage has been detected. Further, the controller 50 may perform control so as to prohibit all charging and discharging processes with respect to the power supply 12 in step S312. Further, the controller 50 may perform control so as to prohibit a discharging process from the power supply 12 to components other than the controller 50 in step S312.

As described above, the third threshold may be set based on the permittivity of the electrolytic solution or the relative permittivity of the electrolytic solution. When the permittivity or the relative permittivity of the electrolytic solution is known, the electrostatic capacitance of the electrostatic capacitance sensor 80 during the electrolytic solution leakage is derived. From the derived electrostatic capacitance, a time required for charging or charging/discharging of the capacitor during the electrolytic solution leakage may be derived, and this value may be used as the third threshold. As another example, the time required for charging or charging/discharging of the capacitor during the electrolytic solution leakage may be experimentally calculated, and this value may be used as the third threshold. It is apparent that the third threshold set as described above is based on the permittivity of the electrolytic solution or the relative permittivity of the electrolytic solution.

As described above, the fourth threshold may be set based on the permittivity of the water or the relative permittivity of the water. When the permittivity or the relative permittivity of the water is known, the electrostatic capacitance of the electrostatic capacitance sensor 80 during the submersion is derived. From the derived electrostatic capacitance, a time required for charging or charging/discharging of the capacitor during the submersion may be derived, and this value may be used as the fourth threshold. As another example, the time required for charging or charging/discharging of the capacitor during the submersion may be experimentally calculated, and this value may be used as the fourth threshold. It is apparent that the fourth threshold set as described above is based on the permittivity of the water or the relative permittivity of the water.

In the above-described embodiment, it is assumed that the permittivity and the relative permittivity of the electrolytic solution are smaller than the permittivity and the relative permittivity of the water. Therefore, the controller 50 determines that the submersion has occurred when it is determined in step S308 that the electrostatic capacitance is large (step S309), and determines that the electrolytic solution leakage has been detected when it is determined in step S310 that the electrostatic capacitance is moderate (step S311). When the permittivity and the relative permittivity of the water are smaller than the permittivity and the relative permittivity of the electrolytic solution, it is determined that the electrolytic solution leakage has been detected when it is determined in step S308 that the electrostatic capacitance is large (step S309), and it is determined that the submersion has occurred when it is determined in step S310 that the electrostatic capacitance is moderate (step S311).

The controller 50 may perform the same process as that in step S312 after step S309. Further, the notification controller 54 may control the notification unit 45 so as to notify after step S309 that the submersion has been detected.

The present disclosure is not limited to the above-described embodiments, and can be appropriately modified, improved, and the like. For example, the controller 50 may only detect entering of water from the openings K1 to K5 based on a comparison between an output of the electrostatic capacitance sensor 80 and a threshold (fourth threshold) that is based on a permittivity of water or a relative permittivity of the water, without detecting leakage of an electrolytic solution.

It should be noted that the submersion is merely an example of entering of a liquid into the power supply unit case 11. The liquid detector 52 may detect the entering of liquid described above by the control procedure even when the liquid enters into the power supply unit case 11 due to being wet with rain or spilling the liquid.

At least the following matters are described in the present description. Components corresponding to the above-described embodiments are shown in parentheses, but the present disclosure is not limited thereto.

(1)

A power supply unit (power supply unit 10) of an aerosol generation apparatus (aerosol suction device 1) including:

a power supply (power supply 12) capable of discharging to a load for generating an aerosol from an aerosol source;

a controller (controller 50) configured to control the power supply; and a housing (power supply unit case 11) configured to house the power supply and the controller, in which the controller is configured to detect at least one of leakage of a liquid inside the housing and entering of a liquid into the housing.

According to (1), the controller can detect at least one of the leakage of the liquid inside the housing and the entering of the liquid into the housing. Further, an influence of at least one of the leakage of the liquid and the entering of the liquid on an operation of the aerosol generation apparatus can be avoided.

(2)

The power supply unit of the aerosol generation apparatus according to (1), further including:

an electrostatic capacitance sensor (electrostatic capacitance sensor 80), in which the controller is configured to detect, based on an output of the electrostatic capacitance sensor, at least one of the leakage and the entering.

According to (2), the electrostatic capacitance sensor is used, so that the leakage of the liquid, the entering of the liquid, and the like can be accurately detected with an inexpensive configuration.

(3)

The power supply unit of the aerosol generation apparatus according to (2), in which the power supply includes an electrolytic solution, and the controller is configured to detect, based on the output of the electrostatic capacitance sensor, leakage of the electrolytic solution that is the leakage.

According to (3), the electrolytic solution leakage of the power supply can be detected. Further, an influence of the electrolytic solution leakage on the operation of the aerosol generation apparatus can be avoided.

(4)

The power supply unit of the aerosol generation apparatus according to (3), further including:

a first porous body (first porous body 82) configured to guide the electrolytic solution to the electrostatic capacitance sensor; and a power supply holder that is disposed inside the housing and configured to hold the power supply, in which at least a part of the first porous body is disposed between the power supply and the power supply holder.

According to (4), since at least a part of the first porous body, which guides the electrolytic solution to the electrostatic capacitance sensor, is disposed between the power supply and the power supply holder, even when the electrolytic solution leaks between the power supply and the power supply holder, the electrolytic solution leakage can be detected.

(5)

The power supply unit of the aerosol generation apparatus according to (3), further including:

a first porous body (first porous body 82) configured to guide the electrolytic solution to the electrostatic capacitance sensor, in which the power supply includes at least one of a safety valve and a tab (tab 12*b*), and at least a part of the first porous body is disposed so as to abut at least one of the safety valve and the tab, or disposed in a vicinity of at least one of the safety valve and the tab.

According to (5), since at least a part of the first porous body, which guides the electrolytic solution to the electrostatic capacitance sensor, is disposed so as to abut at least one of the safety valve and the tab or disposed in the vicinity thereof, when the electrolytic solution leakage occurs at the safety valve, the tab, and the like of the power supply where the electrolytic solution leakage easily occurs, the electrolytic solution leakage can be effectively and rapidly detected.

(6)

The power supply unit of the aerosol generation apparatus according to (4) or (5), in which the electrostatic capacitance sensor includes an electrode (electrode 81), and an area of the first porous body on a surface facing the electrode is equal to an area of the electrode.

According to (6), since the area of the first porous body on the surface facing the electrode is equal to the area of the electrode, the electrolytic solution leakage can be detected wherever the electrolytic solution is absorbed in the first porous body.

(7)

The power supply unit of the aerosol generation apparatus according to (4) or (5), in which the electrostatic capacitance sensor includes an electrode (electrode 81), and an area of the first porous body on a surface facing the electrode is smaller than an area of the electrode.

According to (7), since the area of the first porous body on the surface facing the electrode is smaller than the area of the electrode, the electrolytic solution leakage can be detected even when there is some error in sizes of the electrostatic capacitance sensor and/or the first porous body.

(8)

The power supply unit of the aerosol generation apparatus according to any one of (4) to (7), including:

a circuit board (first circuit board 71, second circuit board 72); and a second porous body (second porous body 84) provided between the electrostatic capacitance sensor and the circuit board.

According to (8), since the second porous body is provided between the electrostatic capacitance sensor and the circuit board, the circuit board can be protected (isolated) from the electrolytic solution.

(9)

The power supply unit of the aerosol generation apparatus according to (8), in which physical properties of the first porous body are different from physical properties of the second porous body.

According to (9), the physical properties of the first porous body and the second porous body are changed, so that appropriate porous bodies can be selected in accordance with requirements required for the respective porous bodies.

(10)

The power supply unit of the aerosol generation apparatus according to (8) or (9), in which the second porous body is configured to hold a larger amount of the electrolytic solution than the first porous body.

According to (10), since a liquid holding capacity of the second porous body is higher, the circuit board can be more effectively protected from the electrolytic solution.

(11)

The power supply unit of the aerosol generation apparatus according to (8) or (9), in which the first porous body is configured to transport the electrolytic solution faster than the second porous body.

According to (11), since a liquid transportation capacity of the first porous body is higher, the electrolytic solution can be rapidly transported to the electrostatic capacitance sensor, and the electrolytic solution leakage can be detected earlier.

(12)

The power supply unit of the aerosol generation apparatus according to (8) or (9), in which the second porous body is thicker than the first porous body.

According to (12), since the first porous body is thinner, the electrolytic solution can be rapidly transported to the electrostatic capacitance sensor, and the electrolytic solution leakage can be detected earlier.

(13)

The power supply unit of the aerosol generation apparatus according to (8) or (9), in which the second porous body is larger than the first porous body.

According to (13), since the second porous body is larger, the second porous body can hold a large amount of the electrolytic solution without escaping, and the circuit board can be more effectively protected from the electrolytic solution.

(14)

The power supply unit of the aerosol generation apparatus according to (8) or (9), in which open porosity of the second porous body is higher than open porosity of the first porous body.

According to (14), since the open porosity of the second porous body is higher, the second porous body can hold a large amount of the electrolytic solution without escaping, and the circuit board can be more effectively protected from the electrolytic solution.

(15)

The power supply unit of the aerosol generation apparatus according to any one of (8) to (14), in which the electrostatic capacitance sensor includes an electrode (electrode 81), and an area of the second porous body on a surface facing the electrode is larger than an area of the electrode.

According to (15), since the area of the second porous body on the surface facing the electrode is larger than the area of the electrode, the second porous body can hold a large amount of the electrolytic solution without escaping, and the circuit board can be more effectively protected from the electrolytic solution.

(16)

The power supply unit of the aerosol generation apparatus according to any one of (3) to (15), in which the controller is configured to detect leakage of the electrolytic solution based on a comparison between the output of the electrostatic capacitance sensor and a threshold that is based on a permittivity of the electrolytic solution or a relative permittivity of the electrolytic solution.

According to (16), only the electrolytic solution leakage can be distinctively detected by the comparison between the output of the electrostatic capacitance sensor and the threshold (first threshold) that is based on the permittivity of the electrolytic solution or the relative permittivity of the electrolytic solution.

(17)

The power supply unit of the aerosol generation apparatus according to (2), in which the housing includes an opening (openings K1 to K5), and the controller is configured to detect, based on the output of the electrostatic capacitance sensor, entering of water from the opening as the entering.

According to (17), the entering of the water from the opening can be detected. Further, an influence of the entering of the water on the operation of the aerosol generation apparatus can be avoided.

(18)

The power supply unit of the aerosol generation apparatus according to (17), further including:

a porous body (first porous body 82) configured to guide the water toward the electrostatic capacitance sensor, in which at least a part of the porous body is disposed so as to abut the opening or disposed in a vicinity of the opening.

According to (18), since at least a part of the porous body that guides the water toward the electrostatic capacitance sensor is disposed so as to abut the opening of the housing or disposed in the vicinity of the opening, entering of water can be effectively detected when the water enters from the opening.

(19)

The power supply unit of the aerosol generation apparatus according to (17) or (18), further including:

a connector (charging terminal 43) configured to be electrically connected to a charger or a charging cable, in which the opening is formed around the connector.

According to (19), entering of water from the connector can be detected. Further, an influence of the entering of the water on the operation of the aerosol generation apparatus can be avoided.

(20)

The power supply unit of the aerosol generation apparatus according to (17) or (18), in which the housing includes an introduction port (air intake port 11*c*) through which outside air is introduced when a user suctions, and the opening is the introduction port.

According to (20), entering of water from the introduction port can be detected. Further, an influence of the entering of the water on the operation of the aerosol generation apparatus can be avoided.

(21)

The power supply unit of the aerosol generation apparatus according to (17) or (18), further including:

an operable interface (operation unit 14), in which the opening is formed around the interface.

According to (21), entering of water from the interface such as an operation button can be detected. Further, an influence of the entering of the water on the operation of the aerosol generation apparatus can be avoided.

(22)

The power supply unit of the aerosol generation apparatus according to (17) or (18), further including:

a terminal (discharge terminal 41) configured to be electrically connected to the load, in which the opening is formed around the terminal.

According to (22), entering of water from the terminal that can be electrically connected to the load can be detected. Further, an influence of the entering of the water on the operation of the aerosol generation apparatus can be avoided.

(23)

The power supply unit of the aerosol generation apparatus according to (17) or (18), further including:

a suction sensor (intake sensor 15) configured to detect a user's suction, in which the housing includes an opening port (air supply portion 42) configured to open a part of the suction sensor to outside air, and the opening is the opening port.

According to (23), entering of water from the opening port that opens a part of the suction sensor to outside air can be detected. Further, an influence of the entering of the water on the operation of the aerosol generation apparatus can be avoided.

(24)

The power supply unit of the aerosol generation apparatus according to any one of (17) to (23), in which the controller is configured to detect the entering of the water from the opening based on a comparison between the output of the electrostatic capacitance sensor and a threshold (fourth threshold) that is based on a permittivity of the water or a relative permittivity of the water.

According to (24), only submersion can be distinctively detected by a comparison between the output of the electrostatic capacitance sensor and the threshold that is based on the permittivity of the water or the relative permittivity of the water.

(25)

The power supply unit of the aerosol generation apparatus according to (1), further including:

an electrostatic capacitance sensor (electrostatic capacitance sensor 80), in which the controller is configured to detect the leakage and the entering without distinction based on an output of the electrostatic capacitance sensor.

According to (25), since the electrostatic capacitance sensor is used to determine the leakage and the entering of the liquid without distinction, the threshold is easily set. Further, since an algorithm for determining the leakage and the entering of the liquid is simplified, a cost of the power supply unit of the aerosol generation apparatus can be reduced.

(26)

The power supply unit of the aerosol generation apparatus according to (25), in which the power supply includes an electrolytic solution, and the controller is configured to detect leakage of the electrolytic solution and the entering of the water without distinction based on a comparison between the output of the electrostatic capacitance sensor and a threshold (second threshold) that is based on a permittivity equal to or smaller than a permittivity of the electrolytic solution and equal to or smaller than a permittivity of the water, or that is based on a relative permittivity equal to or smaller than a relative permittivity of the electrolytic solution and equal to or smaller than a relative permittivity of the water.

According to (26), the electrolytic solution leakage and the entering of the water can be detected without distinction by the comparison between the output of the electrostatic capacitance sensor and the threshold that is based on the permittivity equal to or smaller than the permittivity of the electrolytic solution and equal to or smaller than the permittivity of the water, or that is based on the relative permittivity equal to or smaller than the relative permittivity of the electrolytic solution and equal to or smaller than the relative permittivity of the water. Further, since an algorithm for determining the leakage and the entering of the liquid is simplified, the cost of the power supply unit of the aerosol generation apparatus can be reduced.

(27)

The power supply unit of the aerosol generation apparatus according to (1), further including:

an electrostatic capacitance sensor (electrostatic capacitance sensor 80), in which the power supply includes an electrolytic solution, and the controller is configured to detect leakage of the electrolytic solution as the leakage, based on an output of the electrostatic capacitance sensor and a threshold (third threshold) that is based on a permittivity of the electrolytic solution or a relative permittivity of the electrolytic solution, and the controller is configured to detect entering of water as the entering, based on the output of the electrostatic capacitance sensor and another threshold (fourth threshold) that is based on a permittivity of the water or a relative permittivity of the water.

According to (27), the electrolytic solution leakage can be detected by the comparison between the output of the electrostatic capacitance sensor and the threshold, and the submersion can be detected by the comparison between the output of the electrostatic capacitance sensor and another threshold. Accordingly, the electrolytic solution leakage and the entering of the water can be appropriately and distinctively detected. Therefore, appropriate measures can be respectively taken against the electrolytic solution leakage and the entering of the water.

(28)

A power supply unit (power supply unit 10) of an aerosol generation apparatus (aerosol suction device 1) including:

a power supply (power supply 12) configured to discharge to a load that generates an aerosol from an aerosol source;

a controller (controller 50) configured to control the power supply;

a housing (power supply unit case 11) configured to house the power supply and the controller;

a suction sensor (intake sensor 15) configured to detect a user's suction; and an electrostatic capacitance sensor (electrostatic capacitance sensor 80) that is separate from the suction sensor and housed in the housing, in which the controller is electrically connected to the power supply, the suction sensor, and the electrostatic capacitance sensor.

According to (28), the electrostatic capacitance sensor separate from the suction sensor can detect at least one of leakage of a liquid inside the housing and entering of the liquid into the housing. Further, an influence of at least one of the leakage of the liquid and the entering of the liquid on the operation of the aerosol generation apparatus can be avoided.

(29)

A control method of a power supply unit (power supply unit 10) of an aerosol generation apparatus (aerosol suction device 1) in which a power supply (power supply 12) is housed in a housing (power supply unit case 11), the power supply being capable of discharging to a load for generating an aerosol from an aerosol source, the control method including:

detecting at least one of leakage of a liquid inside the housing and entering of a liquid into the housing.

According to (29), at least one of the leakage of the liquid inside the housing and the5 entering of the liquid into the housing can be detected. Further, an influence of at least one of the leakage of the liquid and the entering of the liquid on the operation of the aerosol generation apparatus can be avoided.

(30)

A control program of a power supply unit (power supply unit 10) of an aerosol generation apparatus (aerosol suction device 1) in which a power supply (power supply 12) is housed in a housing (power supply unit case 11), the power supply being capable of discharging to a load for generating an aerosol from an aerosol source, the control program causing a computer (controller 50) to perform a step of:

detecting at least one of leakage of a liquid inside the housing and entering of a liquid into the housing is executed.

According to (30), at least one of the leakage of the liquid inside the housing and the entering of the liquid into the housing can be detected. Further, an influence of at least one of the leakage of the liquid and the entering of the liquid on the operation of the aerosol generation apparatus can be avoided.

The invention claimed is:

1. A power supply apparatus for an aerosol generation apparatus, comprising:
   a power supply including an electrolytic solution and configured to discharge to a load for generating an aerosol from an aerosol source;
   a housing configured to house the power supply and a controller;
   an electrostatic capacitance sensor;
   a first porous body configured to guide the electrolytic solution to the electrostatic capacitance sensor; and
   the controller configured to
   control the power supply; and
   detect, based on an output of the electrostatic capacitance sensor, leakage of the electrolytic solution inside the housing.

2. The power supply apparatus of claim 1, further comprising:
   a power supply holder that is disposed inside the housing and configured to hold the power supply, wherein
   at least a part of the first porous body is disposed between the power supply and the power supply holder.

3. The power supply apparatus of claim 1,
   the power supply includes al least one of a safety valve and a tab, and
   at least a part of the first porous body is disposed so as to abut at least one of the safety valve and the tab, or disposed in a vicinity of at least one of the safety valve and the tab.

4. The power supply apparatus of claim 1, wherein
   the electrostatic capacitance sensor includes an electrode, and
   an area of the first porous body on a surface facing the electrode is equal to an area of the electrode.

5. The power supply apparatus of claim 1, wherein
   the electrostatic capacitance sensor includes an electrode, and
   an area of the first porous body on a surface facing the electrode is smaller than an area of the electrode.

6. The power supply apparatus of claim 1, comprising:
   a circuit board; and
   a second porous body provided between the electrostatic capacitance sensor and the circuit board.

7. The power supply apparatus of claim 6, wherein
   physical properties of the first porous body are different from physical properties of the second porous body.

8. The power supply apparatus of claim 6, wherein
   the second porous body is configured to hold a larger amount of the electrolytic solution than the first porous body.

9. The power supply apparatus of claim 6, wherein
   the first porous body is configured to transport the electrolytic solution faster than the second porous body.

10. The power supply apparatus of claim 6, wherein
    the second porous body is thicker than the first porous body.

11. The power supply apparatus of claim 6, wherein
the second porous body is larger than the first porous body.

12. The power supply apparatus of claim 6, wherein
open porosity of the second porous body is higher than open porosity of the first porous body.

13. The power supply apparatus of claim 6, wherein
the electrostatic capacitance sensor includes an electrode, and
an area of the second porous body on a surface facing the electrode is larger than an area of the electrode.

14. The power supply apparatus of claim 1, wherein
the controller is configured to detect leakage of the electrolytic solution based on a comparison between the output of the electrostatic capacitance sensor and a threshold that is based on a permittivity of the electrolytic solution or a relative permittivity of the electrolytic solution.

15. A power supply apparatus for an aerosol generation apparatus, comprising:
a power supply configured to discharge to a load for generating an aerosol from an aerosol source;
a controller configured to control the power supply;
a housing configured to house the power supply and the controller; and
an electrostatic capacitance sensor, wherein
the housing includes an opening,
the controller is configured to detect, based on an output of the electrostatic capacitance sensor, entering of water from the opening to an inside of the housing,
the power supply apparatus further includes a porous body configured to guide the water toward the electrostatic capacitance sensor, and
at least a part of the porous body is disposed so as to abut the opening or disposed in a vicinity of the opening.

16. The power supply apparatus of claim 15, further comprising:
a connector configured to be electrically connected to a charger or a charging cable, wherein
the opening is formed around the connector.

17. The power supply apparatus of claim 15, wherein
the housing includes an introduction port through which outside air is introduced when a user suctions, and
the opening is the introduction port.

18. A power supply apparatus for an aerosol generation apparatus, comprising:
a power supply configured to discharge to a load for generating an aerosol from an aerosol source;
a controller configured to control the power supply;
a housing configured to house the power supply and the controller; and
an electrostatic capacitance sensor, wherein
the controller is configured to detect leakage of a liquid inside the housing and entering of a liquid into the housing without distinction based on an output of the electrostatic capacitance sensor.

19. The power supply apparatus of claim 18, wherein
the power supply includes an electrolytic solution, and
the controller is configured to detect leakage of the electrolytic solution and the entering of the water without distinction based on a comparison between the output of the electrostatic capacitance sensor and a threshold that is based on a permittivity equal to or smaller than a permittivity of the electrolytic solution and equal to or smaller than a permittivity of the water, or that is based on a relative permittivity equal to or smaller than a relative permittivity of the electrolytic solution and equal to or smaller than a relative permittivity of the water.

20. A power supply apparatus for an aerosol generation apparatus, comprising:
a power supply configured to discharge to a load for generating an aerosol from an aerosol source;
a controller configured to control the power supply;
a housing configured to house the power supply and the controller; and
an electrostatic capacitance sensor, wherein
the power supply includes an electrolytic solution, and
the controller is configured to detect leakage of the electrolytic solution inside the housing, based on an output of the electrostatic capacitance sensor and a threshold that is based on a permittivity of the electrolytic solution or a relative permittivity of the electrolytic solution, and
the controller is configured to detect entering of water into the housing, based on the output of the electrostatic capacitance sensor and another threshold that is based on a permittivity of the water or a relative permittivity of the water.

* * * * *